United States Patent
Hsueh et al.

(10) Patent No.: US 11,348,130 B2
(45) Date of Patent: May 31, 2022

(54) UTILIZING A SKETCHING GENERATOR TO ADAPTIVELY GENERATE CONTENT-CAMPAIGN PREDICTIONS FOR MULTI-DIMENSIONAL OR HIGH-DIMENSIONAL TARGETING CRITERIA

(71) Applicant: Adobe Inc., San Jose, CA (US)

(72) Inventors: Chih Hsin Hsueh, Clayton, CA (US); Viswanathan Swaminathan, Saratoga, CA (US); Venkata Karthik Penikalapati, Fremont, CA (US); Seth Olson, Berkeley, CA (US); Michael Schiff, Berkeley, CA (US); Gang Wu, San Jose, CA (US); Daniel Pang, Fremont, CA (US); Alok Kothari, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/995,530

(22) Filed: Aug. 17, 2020

(65) Prior Publication Data

US 2022/0051274 A1 Feb. 17, 2022

(51) Int. Cl.
*G06Q 30/02* (2012.01)
*G06N 20/00* (2019.01)

(52) U.S. Cl.
CPC ......... *G06Q 30/0206* (2013.01); *G06N 20/00* (2019.01); *G06Q 30/0205* (2013.01);
(Continued)

(58) Field of Classification Search
CPC .................................................. G06Q 30/02
See application file for complete search history.

(56) References Cited

U.S. PATENT DOCUMENTS

2010/0262498 A1* 10/2010 Nolet ............... G06Q 30/02
  705/14.71
2011/0231264 A1* 9/2011 Dilling ............ G06Q 30/0275
  705/14.71
(Continued)

FOREIGN PATENT DOCUMENTS

WO WO 2014/022387 A2 * 2/2014 ............ G06Q 30/08

OTHER PUBLICATIONS

U. Dineshan; S. Kheang; S. Sreepathy; R. Farmer; K. Lee; W. Tran, Method and System for Conducting Second Price auctions for Maximizing Video Advertising Yield by Considering Success Rate in an Auction (English (United States)), The IP.com Prior Art Database, Jan. 15, 2019 (Year: 2019).*

(Continued)

*Primary Examiner* — Marilyn G Macasiano
(74) *Attorney, Agent, or Firm* — Keller Preece PLLC

(57) ABSTRACT

The present disclosure relates to systems, non-transitory computer-readable media, and methods to generate sketches for clearing-bid values and bid-success rates based on multi-dimensional targeting criteria for a digital-content campaign and dynamically determine predicted values for the digital-content campaign based on the sketches. To illustrate, the disclosed systems can use a running-average-tuple-sketch to generate tuple sketches of historical clearing-bid values and tuple sketches of historical bid-success-rates from historical auction data. Based on the tuple sketches, the disclosed systems can determine one or more of a predicted cost per quantity of impressions, a predicted number of impressions, or a predicted expenditure for the digital-content campaign—according to user-input targeting criteria and expenditure constraints.

20 Claims, 16 Drawing Sheets

(52) U.S. Cl.
CPC ..... *G06Q 30/0246* (2013.01); *G06Q 30/0247* (2013.01); *G06Q 30/0261* (2013.01); *G06Q 30/0275* (2013.01)

(56) References Cited

U.S. PATENT DOCUMENTS

| | | | |
|---|---|---|---|
| 2012/0041816 A1* | 2/2012 | Buchalter | G06Q 30/02 705/14.71 |
| 2015/0088665 A1* | 3/2015 | Karlsson | G06Q 30/0275 705/14.71 |
| 2018/0293613 A1* | 10/2018 | Haws | G06Q 30/0242 |

OTHER PUBLICATIONS

Apache DataSketches; A software library of stochastic streaming algorithms; Date downloaded Oct. 20, 2020; http://datasketches.apache.org/.

S Muthukrishnan. 2009. Ad exchanges: Research issues. In Internet and network economics. Springer, 1-12.

Yeming Shi, Claudia Perlich, Rod Hook, Wickus Martin, Melinda Han Williams, Justin Moynihan, Patrick McCarthy, Peter Lenz, Reka Daniel-Weiner, and Roger Cost. 2018. Audience Size Forecasting: Fast and Smart Budget Planning for Media Buyers. In Proceedings of the 24th ACM SIGKDD International Conference on Knowledge Discovery & Data Mining (KDD '18). Association for Computing Machinery, New York, NY, USA, 744753.

Apache DataSketches of the Apache DataSketches library archived for download at datasketches.apache.org/docs/Tuple/TupleOverview.html; Date downloaded Nov. 4, 2020.

Edith Cohen and Haim Kaplan, Summarizing Data Using Bottom-K Sketches, In Proceedings of the 26th Annual ACM Symposium on Principles of Distributed Computing (Aug. 2007), p. 225-234 ("Cohen").

Ziv Bar-Yossef, T. S. Jayram, Ravi Kumar, D. Sivakumar, and Luca Trevisan, Counting Distinct Elements in a Data Stream, in Rolim J.D.P., Vadhan S. (eds.) Randomization and Approximation Techniques in Computer Science, RANDOM 2002 ("Bar Yossef").

Apache DataSketches; "Theta Sketch Framework"; Date downloaded Oct. 29, 2020; http://datasketches.apache.org/docs/Theta/ThetaSketchFramework.html.

Sinha et al.; "Forecasting Granular Audience Size for Online Advertising," Jan. 8, 2019; https://arxiv.org/abs/1901.02412.

Adobe Ad Cloud Features: Date downloaded Oct. 29, 2020; https://www.adobe.com/advertising/adobe-advertising-cloud-features.html.

Wikipedia: The Free Encyclopedia; "Streaming algorithm" Date downloaded Oct. 20, 2020; https://en.wikipedia.org/wiki/Streaming_algorithm.

Wikipedia: The Free Encyclopedia; "Density estimation" Date downloaded Oct. 20, 2020; https://en.wikipedia.org/wiki/Density_estimation.

Marc Galens; The Drum; "Benefits of RTB for brands" May 2, 2013; https://www.thedrum.com/knowledge-bank/2013/05/02/benefits-rtb-brands.

* cited by examiner

*Fig. 4G*

UTILIZING A SKETCHING GENERATOR TO ADAPTIVELY GENERATE CONTENT-CAMPAIGN PREDICTIONS FOR MULTI-DIMENSIONAL OR HIGH-DIMENSIONAL TARGETING CRITERIA

BACKGROUND

In recent years, computing systems have developed models for real-time-bidding auctions in which computers send bids for the right to place digital content in virtual slots. In this computer-network environment for real-time-bidding auctions, computing systems send and receive bids on the scale of milliseconds (or faster). In addition to computing systems placing or receiving bids, some existing campaign-forecasting systems can forecast values for such bidding auctions using graphical user interfaces to identify target audiences. For instance, some conventional campaign-forecasting systems employ regression models, counting methods, etc. to forecast expenditures or other values relevant to a digital-content campaign. As processing and speed has increased, conventional campaign-forecasting systems have employed increasingly sophisticated models for more robust targeting criteria to project values as part of real-time-bidding auctions. Unfortunately, conventional campaign-forecasting systems demonstrate a number of technical problems that lead to excessive storage consumption and various elements of system inflexibility (e.g., conditional assumptions, limited functionality), as explained further below.

BRIEF SUMMARY

This disclosure describes one or more embodiments of methods, non-transitory computer-readable media, and systems that solve one or more of the foregoing problems and provide other benefits. For example, in some embodiments, the disclosed systems generate sketches for clearing-bid values and bid-success rates corresponding to a digital-content campaign based on multi-dimensional targeting criteria and determine predicted values for the digital-content campaign based on the sketches. To illustrate, in some cases, the disclosed systems use a running-average-tuple-sketch algorithm to generate tuple sketches of historical clearing-bid values and tuple sketches of historical bid-success-rates from historical auction data. Based on the tuple sketches, the disclosed systems can determine one or more of a predicted cost per quantity of impressions (e.g., a predicted cost per thousand impressions ("CPM")), a predicted number of impressions, or a predicted expenditure for the digital-content campaign—according to user-input targeting criteria and expenditure constraints.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIGS. 4A-4H illustrate graphical user interfaces on a computing device for implementing a content-campaign-prediction system in accordance with one or more embodiments.

DETAILED DESCRIPTION

Figure 1:
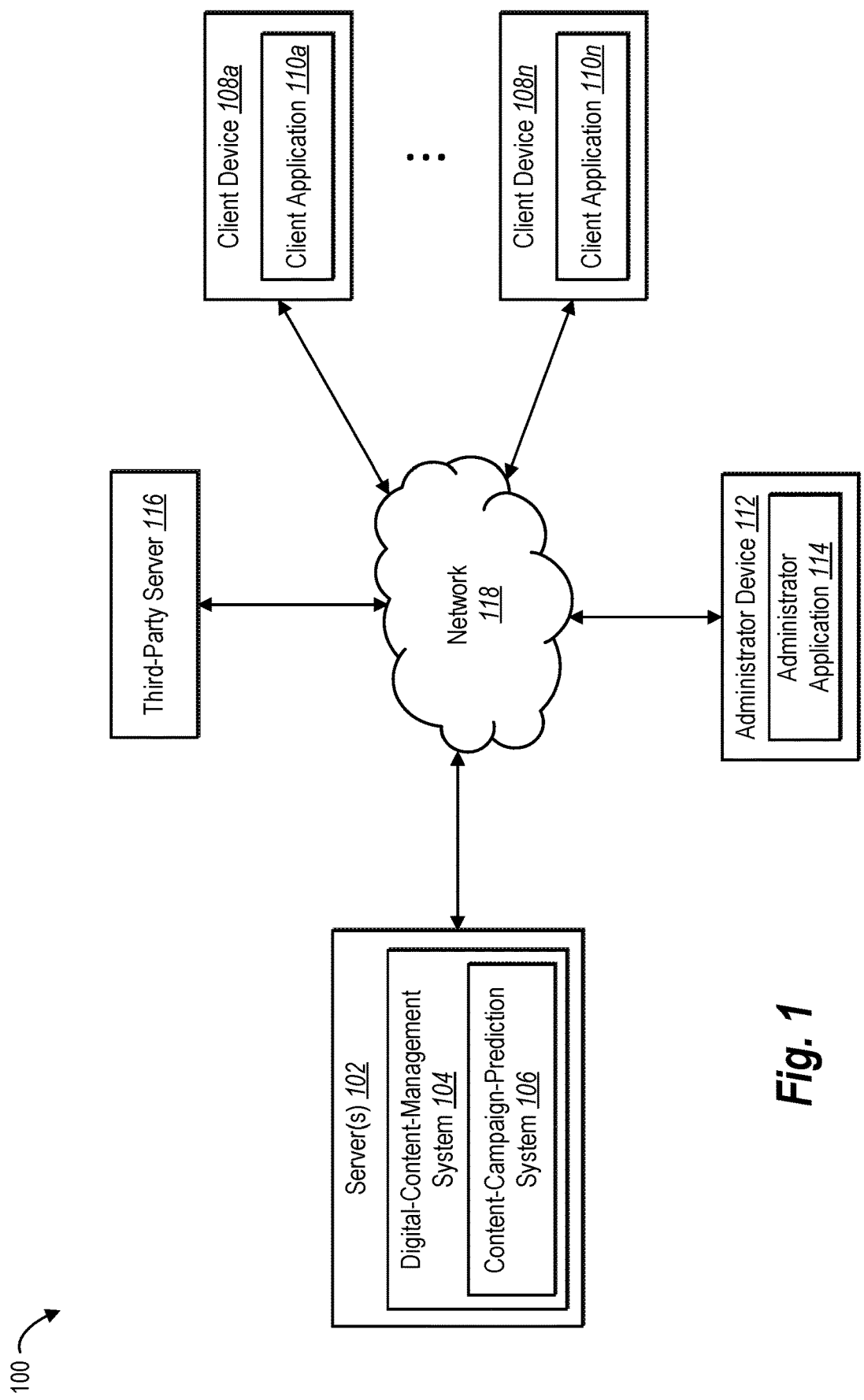
FIG. 1 illustrates a diagram of a computing system environment in which a content-campaign-prediction system can operate in accordance with one or more embodiments.

This disclosure describes one or more embodiments of a content-campaign-prediction system that utilizes a sketch generator to adaptively generate sketches for historical clearing-bid values and historical bid-success rates corresponding to a digital-content campaign based on targeting dimensions and determines predicted values for implementing the digital-content campaign in accordance with the sketches and the targeting dimensions. For example, in one or more embodiments, the content-campaign-prediction system can generate sketches for clearing-bid values and bid-success rates from historical auction data by using a running-average-tuple-sketch algorithm. From the generated sketches, the content-campaign-prediction system can perform multi-dimensional set operations as a basis for generating distributions of clearing-bid values and bid-success rates. Based on the distributions, the content-campaign-prediction system can generate (e.g., in real time or near-real time) a predicted cost per quantity of impressions and predicted number of impressions for a digital-content campaign.

To illustrate, the content-campaign-prediction system 106 can collect historical auction data for a real-time-bidding system. The content-campaign-prediction system can group historical auction data by specific targeting dimensions. Subsequently, the content-campaign-prediction system can generate tuple sketches for each data grouping of historical auctions using a running-average-tuple-sketch algorithm. In some embodiments, the content-campaign-prediction system can store the generated tuple sketches for fast, random access to respond to user requests via an interactive prediction tool (e.g., a campaign-prediction interface).

For example, in some cases, the content-campaign-prediction system receives data from a client device indicating particular targeting dimensions and an expenditure constraint for a digital-content campaign. Based on the targeting dimensions and historical auction data, the content-campaign-prediction system generates, utilizing a sketch generator, a first set of sketches for clearing-bid values and a second set of sketches for bid-success rates. By extracting values from the respective sets of sketches, the content-campaign-prediction system further determines a distribution of clearing-bid values and a distribution of bid-success rates. Using the distributions, the content-campaign-prediction system can generate (and surface on the client device) a predicted cost per quantity of impressions and a predicted number of impressions for the digital-content campaign.

As just mentioned, in some embodiments, the content-campaign-prediction system receives data indicating targeting dimensions and an expenditure constraint. For example, via an interactive campaign-prediction interface, the content-campaign-prediction system can receive targeting dimensions and an expenditure constraint identified by user input. To illustrate, the content-campaign-prediction system can receive one or more selected targeting dimensions that include identified audience segments targeted to receive (and/or exclude from receiving) digital content from a digital-content campaign. Similarly, the content-campaign-prediction system can receive one or more expenditure constraints, such as a budget goal, an optimization goal, a maximum-bid value.

Based on the targeting dimensions and one or more expenditure constraints, the content-campaign-prediction system can leverage historical auction data to generate sketches of values from such data. For example, utilizing a sketch generator, the content-campaign-prediction system can generate a first set of tuple sketches for clearing-bid values and a second set of tuple sketches for bid-success rates. To do so, the content-campaign-prediction system can selectively apply multi-dimensional set operations (e.g., intersections, unions, and/or differences) to tuple sketches of values extracted from historical auction data. That is, in some cases, the content-campaign-prediction system utilizes the targeting dimensions and expenditure constraints to identify values from the historical auction data as a basis for generating the tuple sketches and applying multi-dimensional set operations.

From the first set of tuple sketches for clearing-bid values and the second set of tuple sketches for bid-success rates, in certain implementations, the content-campaign-prediction system generates a distribution of clearing-bid values and a distribution of bid-success rates. To illustrate, the content-campaign-prediction system can generate tuple sketches for clearing-bid values or bid-success rates including respective vector values (e.g., clearing-bid values and bid-success rates). Based on a count of the vector values, the content-campaign-prediction system can determine separate empirical distributions of clearing-bid values and bid-success rates.

Using the empirical distributions of the clearing bid-values and the bid-success rates, the content-campaign-prediction system can generate a predicted cost per quantity of impressions and a predicted number of impressions for the digital-content campaign. For example, the content-campaign-prediction system can generate the predicted cost per quantity of impressions by determining an average clearing-bid value based on a distribution of clearing-bid values. Similarly, the content-campaign-prediction system can generate the predicted number of impressions by determining an average bid-success rate based on the distribution of bid-success rates and multiplying the average bid-success rate by a bid count.

From the predicted number of impressions and the predicted cost per quantity of impressions, the content-campaign-prediction system can generate a predicted expenditure for a digital-content campaign to display on a client device. For example, in some embodiments, the content-campaign-prediction system generates a predicted expenditure by multiplying the predicted number of impressions and the predicted cost per quantity of impressions. Additionally or alternatively, the content-campaign-prediction system can generate a difference value between the predicted expenditure and an expenditure constraint (e.g., received according to user input via a campaign-prediction interface) to display on the client device.

As indicated above, the content-campaign-prediction system can surface, at a campaign-prediction interface, the predicted cost per quantity of impressions, the predicted number of impressions, and/or the predicted expenditure for the digital-content campaign. The content-campaign-prediction system can also dynamically surface updated values for the predicted cost per quantity of impressions and the predicted number of impressions. For example, the content-campaign-prediction system can update the predicted cost per quantity of impressions and the predicted number of impressions in response to user interaction at the campaign-prediction interface to provide additional or alternative targeting dimensions and/or expenditure constraint(s). Similarly, for example, the content-campaign-prediction system can dynamically surface updated values for the predicted cost per quantity of impressions and the predicted number of impressions based on updated historical auction data (e.g., from recent real-time-bidding auctions).

As briefly mentioned above, conventional campaign-forecasting systems exhibit a number of technical problems that consume increased system storage and rigidly forecast various campaign values only under certain conditions. For example, some conventional campaign-forecasting systems implement solutions to avoid accuracy issues involved with scalar representation of targeting criteria (particularly, numerous combinations of targeting criteria). Such conventional systems, however, often require large-scale elastic search clusters that store sampled auction records with relevant metadata. In some cases, the stored data may include data from the most recent two weeks for real-time-bidding auctions. Accordingly, the elastic search cluster approach of conventional campaign-forecasting systems is a computationally expensive approach that increases system storage consumption.

In addition excessive storage consumption, conventional campaign-forecasting systems often run rigid algorithms that cannot handle high dimensional, nested complex set operations to target certain audience segments in a sophisticated manner. To illustrate, conventional systems may focus on web traffic and page view data to estimate an audience size. However, this conventional approach involving frequent itemset mining, conditional probability, and time-series analyses (among other conventional approaches) cannot account for the granularity, complexity, and/or high cardinality of some auction data. In particular, conventional systems cannot account for the myriad combinations of data, such as behavioral targeting data for audience segments, segment targeting.

Beyond inflexible algorithms failing to perform complex operations, some conventional campaign-forecasting systems use a model assuming conditional independence among targeting criteria (e.g., for performing a corresponding regression analysis). This approach therefore requires assumptions that at times are incorrect (or at least cannot be shown as correct/valid). Accordingly, this inflexible, conventional approach reduces the accuracy of results (e.g., by ignoring the covariant between targeting dimensions).

In contrast, the content-campaign-prediction system can provide several technical improvements over conventional campaign-forecasting systems. For example, the contentcampaign-prediction system can consume less system storage than conventional campaign-forecasting systems by utilizing a running-average-tuple-sketch algorithm or other tuple sketch generator. By utilizing a running-average-tuple-sketch algorithm or other sketch generator to determine sketches for clearing-bid values and bid-success rates, the content-campaign-prediction system can compress vast amounts of historical auction data into sketches and downstream determinations. For instance, in some embodiments, the content-campaign-prediction system decreases storage consumption by ten times in comparison to the storage consumption of some conventional systems. To illustrate, some conventional campaign-forecasting systems utilize about 200 gigabytes of data storage for implementing an elastic search cluster on a set of data. For the same set of data, the content-campaign-prediction system utilizes about 20 gigabytes of data storage.

By using less storage consumption, the content-campaign-prediction system can utilize more random-access-data storage for faster processing speeds. Because of its improved access to random-access-data storage, for instance, the content-campaign-prediction system can more quickly determine and surface a predicted number of impressions and a predicted cost per quantity of impressions at a campaign-prediction interface. The content-campaign-prediction system can extemporaneously generate (e.g., in real time or near-real time) such predicted campaign values for a digital-content campaign—in response to receiving data from a client device indicating targeting dimensions and an expenditure constraint for the campaign.

In addition to saving storage consumption and extemporaneous prediction values, the content-campaign-prediction system can process more complex and flexible operations to predict campaign-impression values or expenditure values in comparison to conventional campaign-forecasting systems. For example, utilizing a sketch generator that implements a running-average-tuple-sketch algorithm to generate tuple sketches as disclosed herein, the content-campaign-prediction system can account for the granularity, complexity, and/or high cardinality of some auction data (e.g., behavioral targeting data for audience segments, segment targeting). For instance, the content-campaign-prediction system 106 can easily handle data corresponding to behavior targeting segments, which alone, can exceed 70,000 targeting dimensions.

In addition, by applying set operations to applicable tuple sketches corresponding to a set of targeting dimensions, the content-campaign-prediction system can account for any co-occurrence and/or number of co-occurrences of targeting dimensions (e.g., the co-occurrence of "USA" and "Tier1" across hundreds of billions of auctions). This flexibility of the content-campaign-prediction system extends to nested/complex targeting dimensions, large numbers of layers (and sub-layers) of targeting dimensions, and/or exclusionary dimensions. To illustrate, the targeting dimensions may increase in complexity with various layers and combinations of layers (e.g., targeting dimensions that include (A, B, and C), (none of D, E, and F), and (at least two of G-M), among myriad other combinations, permutations, and the like).

Independent of improved computing-system operations, the content-campaign-prediction system avoids the conditional independence requirements of targeting dimensions that challenge conventional campaign-forecasting systems to generate more accurate predicted campaign-impression or expenditure values. For example, by utilizing a running-average-tuple-sketch algorithm or other sketch generator as disclosed herein, the content-campaign-prediction system can employ arbitrary set operations to quickly estimate (in real-time or near real-time) a predicted number of impressions and a predicted cost per quantity of impressions. Moreover, by using a sketch generator to implement a running-average-tuple-sketch algorithm that generates tuple sketches, for instance, the content-campaign-prediction system avoids the accuracy issue of expressing the targeting dimensions as conditionally-independent features (e.g., in a regression model). That is, the content-campaign-prediction system avoids the accuracy issues introduced by conventional campaign-forecasting systems that ignore the covariance between targeting dimensions. For example, by utilizing a running-average-tuple-sketch algorithm, the content-campaign-prediction system can account for any co-occurrence of targeting dimensions without pre-analyzing combinations of targeting dimensions.

As illustrated by the foregoing examples, the present disclosure utilizes a variety of terms to describe features and advantages of the content-campaign-prediction system. For instance, as used herein, the term "digital-content campaign" refers to a computer-based program for distributing or placing digital content. For example, a digital-content campaign may include a digital advertising campaign or a digital branding campaign that includes a collection of digital advertising content distributed to (or displayed for the view of) users according to limitations of an auction. Relatedly, the term "impressions" refers to instances in which digital content is displayed to a target audience for viewing a portion or all of the digital content. For example, an impression includes digital-content placements shown on a browser or other application in which a portion (e.g., 50%) of the digital content is viewable for a threshold time period.

As further used herein, the term "targeting dimensions" refers to selected criteria for identifying target viewers or recipients of digital content or other limits for placing digital content as part of a digital-content campaign. For example, targeting dimensions can include criteria for identifying audience segments (or portions of audience segments) as potential viewers or recipients of digital content (e.g., text, links, digital photos/videos), timing limitations for digital-content placements, application-type limitations or site-type limitations for digital-content placements, or other targeting dimensions described below. Such targeting dimensions for an audience segment can include a geographical audience segment, a digital service audience segment, a site-type segment, etc. as described further below.

Additionally, as used herein, the terms "expenditure" or "expenditure constraint" refer to a target value or value limit for a cost in relation to a digital-content campaign. In particular, an expenditure or an expenditure constraint may include a monetary value, such as a budget (e.g., $3,300/day), a priority/optimization value (e.g., lowest value for cost per thousand advertisements or impressions ("CPM")), a max-bid value (e.g., a maximum monetary amount for which a bid for digital content placement cannot exceed).

As used herein, the term "sketch" refers to a data collection or structure comprising values summarizing attributes or characteristics of a dataset upon application of a sketch algorithm. For instance, a sketch or a tuple sketch may include an array or vector of values including a hash value and one or more values for summary objects of a target attribute or characteristic. A tuple sketch is a particular type of sketch. In particular, a tuple sketch may include a digital auction identifier (e.g., a representation of a discrete real-time-bidding auction) and at least one associated summary value. An example of a tuple sketch may be as follows: (Auc1, 10.2), in which "Auc1" represents the digital auction identifier and "10.2" represents the summary value for CPM. As another example, "(Auc1, 0.2, 1)" represents a tuple sketch in which "Auc1" represents the digital auction identifier, "0.2" represents the summary value of an internal bid-success rate, and "1" represents the summary value of an external bid-success rate. Myriad other formats of sketches or tuple sketches are herein contemplated. For example, in some implementations, the sketch or tuple sketch may additionally or alternatively include other summary information (e.g., as returned by a sketch generator).

In addition, as used herein, the term "sketch generator" refers to an algorithm and/or a computing model for generating sketches or values derived from (or based on) sketches. In particular, a sketch generator can generate tuple sketches (or other sketches) from historical auction data and perform set operations on the generated sketches. For example, in some embodiments, a sketch generator can apply one or more acts or algorithms to (i) utilize a hash function to generate a hash value (e.g., a hashed representation) of a digital auction identifier for a tuple sketch, (ii) associate a summary value/object with a corresponding hash value as part of the tuple sketch, and/or (iii) apply set operations (e.g., unions, intersections, differences) to tuple sketches to generate unions, intersections, or differences of tuple sketches based on targeting dimensions.

As also used herein, the term "clearing-bid value" refers to a value that is or was bid by an entity upon which the entity won an auction for digital-content placements. In particular, a clearing-bid value can include a winning bid price for an auction of digital-content placements via a real-time-bidding system. In some implementations, the clearing-bid value can include a CPM value (e.g., a value indicating the cost for a thousand impressions).

As further used herein, the term "bid-success rate" refers to a rate of successfully winning an auction for digital-content placements. In particular, a bid-success rate can include a win rate or percentage of bids (e.g., digital offers to place digital content as part of a digital-content campaign) that won over a total number of bids in auctions for digital-content placements. In some implementations, a bid-success rate can include a win rate or percentage of bids won for a combination of auctions (e.g., an internal auction performed by a demand-side platform and an external auction performed by an ad exchange platform). For instance, a bid-success rate may equal the scalar product of an internal-auction-win rate and an external-auction-win rate (e.g., 0.5*0.35). Relatedly, the term "count" as used herein refers to a sum or total number. For example, a "bid count" may include a number of bids identified from historical auction data that are associated with one or more targeting dimensions.

As used in this disclosure, the term "segment" refers to a group of users whose network activities have been tracked and stored in a database. In particular, a segment can include an entire set or an entire population of users who share a common characteristic or can include a subset of users (within the overall set) who share a common characteristic. Such a common characteristic may include a common value for a dimension, such as a common action performed by users or a common attribute of users.

Relatedly, the term "target segment" refers to a segment of users that satisfies targeting dimensions (or search parameters) or shares one or more common characteristics indicated by a user device. Such a target segment may likewise represent users that satisfy a goal or represent users to which an entity seeks to distribute digital content. For example, a target segment can represent or indicate users who have performed a desired action (e.g., completing a purchase, clicking a link, repeated visits, or adding a product to an online shopping cart) and/or who have desired attributes (e.g., live in a particular geographic area, are of a particular age, or have a history of purchasing particular types of products). Similarly, a target segment may represent or indicate users who utilize certain computing devices, use or visit certain internet sites or applications.

For example, a target segment may include a geographical audience segment (e.g., users associated with a physical area defining a location-based digital audience). In particular, a geographical audience segment may correspond to users that use computing devices or applications, visit internet sites, etc. within a designated market area, country, state, city, postal code, federal/state legislative district, and the like. As another example, a target segment may include a digital service audience segment (e.g., a digital audience of users associated with a digital service or digital product), such as users associated with computing devices that currently use, previously used, may potentially use, or have indicated an interest in using a digital service or digital product). As yet another example, a target segment may include a site-type segment (e.g., a digital audience of computing devices that visit/use a website or computer application). Additionally or alternatively, a site-type segment can include categories or tiers of sites, language-based sites, etc.

Relatedly, the term "excluded segment" refers to a segment of users excluded by targeting dimensions or excluded from receiving digital-content placements. Accordingly, an excluded segment can include any geographical audience segment, digital service audience segment, and/or site-type segment to be excluded by targeting dimensions or excluded from receiving digital-content placements as part of a digital-content campaign.

In addition, as used herein, the terms "distribution" refers to a measure of various values or samples from a dataset. Accordingly, a distribution can include an empirical distribution, a sampling distribution or a probability distribution of various possible values or samples of each type of value or sample within a dataset. In particular, a distribution or empirical distribution can include a distribution of bid-success rates, a distribution of clearing-bid values, and the like. In some implementations, the content-campaign-prediction system can represent a distribution utilizing a distribution curve (e.g., a function or mathematical description that fits, within some threshold fit-value, data corresponding to bid-success rates or clearing-bid values). In some embodiments, the content-campaign-prediction system extracts, from a vector (e.g., an array of values populated from tuple sketches), the data corresponding to bid-success rates or clearing-bid values for generating a distribution curve.

Relatedly, as used herein, the term "clearing-bid-value interval" refers to a range of clearing-bid values. In particular, a clearing-bid-value interval can include a range of clearing-bid values over which the content-campaign-prediction system can integrate a function representing a distribution curve of clearing-bid values (e.g., a clearing-bid-value of zero to a max-bid value, optionally represented as [0, max-bid value]).

As further used herein, the term "historical auction data" refer to data from a completed auction for digital-content placements. In particular, historical auction data can include information corresponding to individual bids in a digital auction for placing digital content (e.g., digital auction identifier or summary information, such as clearing-bid value, bid-success rate, win/loss data, targeting dimensions, metadata). Relatedly, the term "auction dataset" refers to a set of historical auction data. In particular, an auction dataset can include a set of historical auction data that satisfies targeting dimensions (e.g., as provided according to user input).

Additional detail will now be provided regarding the content-campaign-prediction system in relation to illustrative figures portraying example embodiments and implementations of the content-campaign-prediction system. For example, FIG. 1 illustrates a computing system environment (or "environment") 100 for implementing a content-campaign-prediction system 106 in accordance with one or more embodiments. As shown in FIG. 1, the environment 100 includes server(s) 102, client devices 108a-108n, an administrator device 112, a third-party server 116, and a network 118. Each of the components of the environment 100 can communicate via the network 118, and the network 118 may be any suitable network over which computing devices can communicate. Example networks are discussed in more detail below in relation to FIG. 8.

As shown in FIG. 1, the environment 100 includes the client devices 108a-108n. The client devices 108a-108n can be one of a variety of computing devices, including a smartphone, tablet, smart television, desktop computer, laptop computer, virtual reality device, augmented reality device, or other computing device as described in relation to FIG. 8. Although FIG. 1 illustrates multiple client devices, in some embodiments the environment 100 can include a single client device. The client devices 108a-108n can further communicate with one or more components of the environment 100 via the network 118. For example, in response to receiving a digital-content placement from the third-party server 116, the client devices 108a-108n can identify user interaction at the digital-content placement and provide corresponding data (e.g., to the administrator device 112).

As shown, the client devices 108a-108n include corresponding client applications 110a-110n. In particular, the client applications 110a-110n may each be a web application, a native application installed on the client devices 108a-108n (e.g., a mobile application, a desktop application), or a cloud-based application where part of the functionality is performed by the server(s) 102. The client applications 110a-110n can present or display information to users associated with the client devices 108a-108n, including digital-content items as part of a digital-content campaign. In addition, users can interact with the client applications 110a-110n to provide user input to, for example, interact with a digital media item in a digital-content item.

As mentioned, the environment 100 includes the administrator device 112. The administrator device 112 can include a variety of computing devices as described in relation to FIG. 8. The administrator device 112 can provide targeting dimensions and one or more expenditure constraints as part of a digital-content campaign. Although FIG. 1 illustrates a single administrator device 112, in some embodiments, the environment 100 can include multiple different administrator devices. The administrator device 112 can further communicate with the server(s) 102 via the network 118 through an administrator application 114. Similar to the client applications 110a-110n, the administrator application 114 may be a web application, a native application installed on the administrator device 112 (e.g., a mobile application, a desktop application), or a cloud-based application, where part of the functionality is performed by the server(s) 102. For example, the administrator device 112 can receive user input via the administrator application 114 (e.g., as a campaign-prediction interface) and provide information pertaining to the user input to the server(s) 102. In response to the user input identifying targeting dimensions and one or more expenditure constraints for a digital-content campaign, the administrator application 114 can receive data for and present, from the server(s) 102, a predicted cost per quantity of impressions and a predicted number of impressions.

As illustrated in FIG. 1, the environment 100 includes the server(s) 102. In some embodiments, the server(s) 102 comprises a demand-side platform, a content server, and/or a data collection server. The server(s) 102 can also comprise an application server, a communication server, a web-hosting server, a social networking server, or a digital content management server. In particular, the server(s) 102 may learn, generate, store, receive, and transmit electronic data, such as executable instructions for (i) determining respective sketches for clearing-bid values and bid-success rates based on targeting dimensions and historical auction data, (ii) determining a distribution of clearing-bid values and a distribution of bid-success rates, and (iii) generating a predicted cost per quantity of impressions for the digital-content campaign based on the distribution of clearing-bid values and a predicted number of impressions for the digital-content campaign based on the distribution of bid-success rates.

For example, the server(s) 102 may receive data from the administrator device 112 based on user input to provide targeting dimensions and one or more expenditure constraints. Subsequently, the server(s) 102 can utilize a sketch generator to perform multi-dimensional set operations to generate an intersection of tuple sketches for clearing-bid values and an intersection of tuple sketches for bid-success rates. Based on empirical distributions of the intersections of tuple sketches, the server(s) 102 can transmit data back to the administrator device 112 in the form of a predicted number of impressions and a predicted cost per quantity of impressions. In response to user input at the administrator device 112 indicating confirmation of the targeting dimensions and the expenditure constraint, the server(s) 102 can further execute a digital-content campaign accordingly by transmitting a digital content with parameters of the digital-content campaign to the third-party server 116.

In some embodiments, the third-party server 116 includes one or more computing devices associated with an ad exchange platform. Thus, the third-party server 116 can implement various acts and algorithms associated with a real-time-bidding system to conduct digital auctions and provide digital-content placements to the client devices 108a-108n. For example, one or more of the client devices 108a-108n may initiate a request to access or view a website or computer application. While one or more of the client devices 108a-108n initiate access (e.g., load) to the website or computer application, the server(s) 102 may execute a bid (which satisfies one or more expenditure constraints of the digital-content campaign) in a digital auction hosted by the third-party server 116. In response to the bid winning the digital auction for one or more potential impressions, the third-party server 116 can transmit digital content to the one or more of the client devices 108a-108n in accordance with targeting dimensions specified by the digital-content campaign.

As further shown in FIG. 1, the content-campaign-prediction system 106 is implemented as part of a digital-content-management system 104 located on the server(s) 102. The digital-content-management system 104 can organize, manage, and/or execute handling of digital-content campaigns. For example, the digital-content-management system 104 can manage access to an administrator account (e.g., associated with the administrator device 112), store digital-content placements, etc. The digital-content-management system 104 can also communicate with one or more components of the environment 100 via the network 118 (e.g., the third-party server 116 to extract historical auction data).

Although FIG. 1 depicts the content-campaign-prediction system 106 located on the server(s) 102, in some embodiments, the content-campaign-prediction system 106 may be implemented by on one or more other components of the environment 100 (e.g., by being located entirely or in part at one or more of the other components). For example, content-campaign-prediction system 106 may be implemented by the client devices 108a-108n, the administrator device 112, and/or the third-party server 116.

In some embodiments, though not illustrated in FIG. 1, the environment 100 may have a different arrangement of components and/or may have a different number or set of components altogether. For example, the client devices 108a-108n, the administrator device 112, and/or the third-party server 116 may communicate directly with the content-campaign-prediction system 106, bypassing the network 118. Additionally or alternatively, the environment 100 may include components, such as a supply-side platform, a publisher ad server, a publisher content server, an agency ad server, other demand-side platforms, etc.

Figure 2:
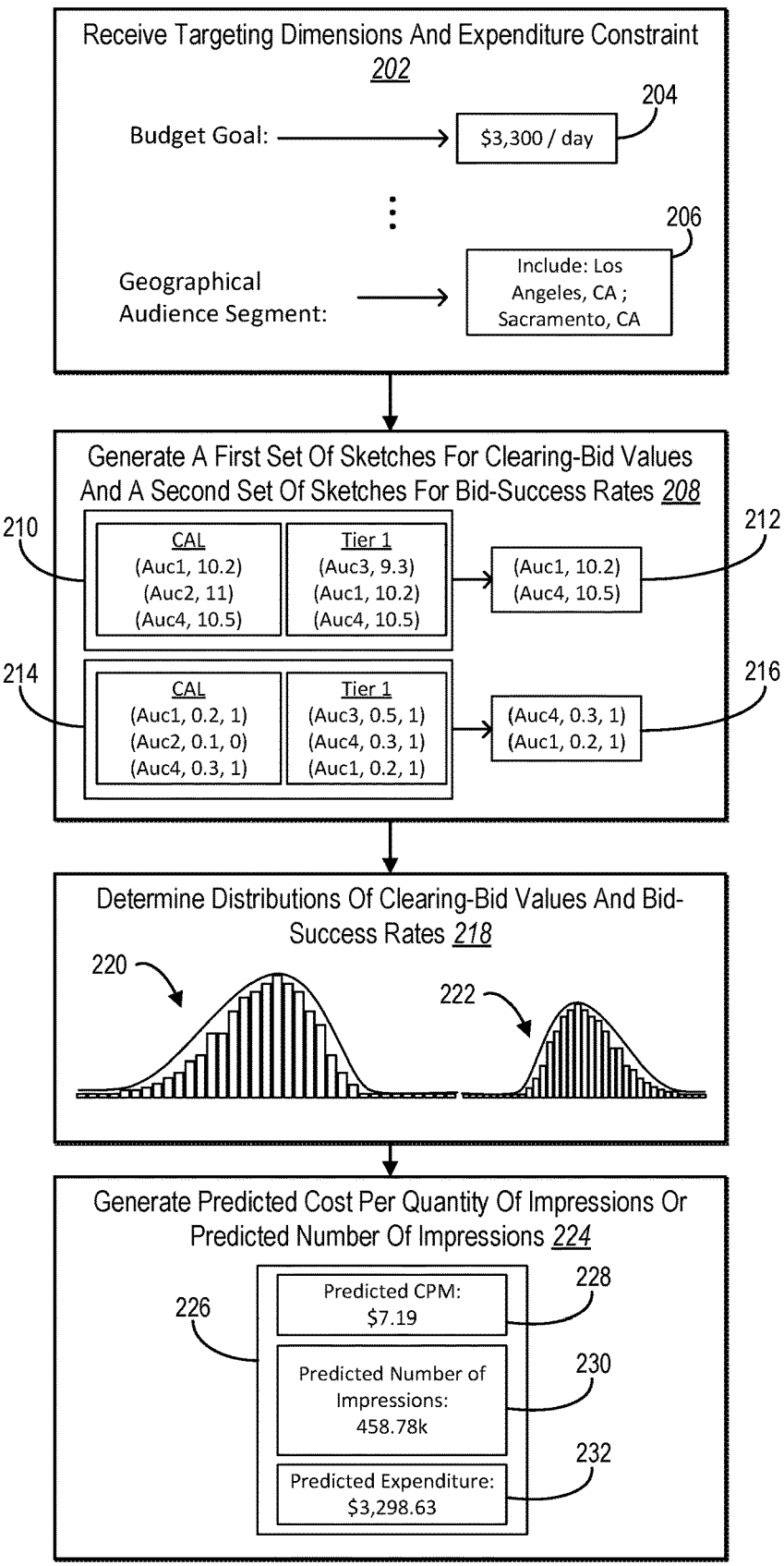
FIG. 2 illustrates a content-campaign-prediction system generating a predicted cost per quantity of impressions and a predicted number of impressions for a digital-content campaign in accordance with one or more embodiments.

As mentioned above, the content-campaign-prediction system 106 can adaptively generate predicted values for implementing a digital content campaign in accordance with targeting dimensions and an expenditure constraint. FIG. 2 illustrates the content-campaign-prediction system 106 generating a predicted cost per quantity of impressions and a predicted number of impressions for a digital-content campaign in accordance with one or more embodiments. As shown in FIG. 2, the content-campaign-prediction system 106 performs acts 202, 208, 218, and 224, each described in more detail below.

At act 202, the content-campaign-prediction system 106 can receive targeting dimensions and an expenditure constraint for a digital-content campaign. For example, based on user input at a campaign-prediction interface, the content-campaign-prediction system 106 may selectively identify targeting dimensions and one or more expenditure constraints as parameters for implementing a custom-designed digital-content campaign. For instance, as shown in FIG. 2, the expenditure constraint includes a budget goal 204, and a targeting dimension includes a geographical audience segment 206. Based on the user input of "$3,300/day" for the budget goal 204 and the user input of "Los Angeles, Calif." and "Sacramento, Calif." for the geographical audience segment 206, the content-campaign-prediction system 106 can generate predictions for the digital-content campaign. These predictions are described in more detail below (e.g., in conjunction with act 224). In addition, the content-campaign-prediction system 106 can generate these predictions based on any number and/or combination of targeting dimensions, expenditure constraints, etc. in addition to or other than that illustrated in FIG. 2.

As indicated by FIG. 2, the content-campaign-prediction system 106 can determine how efficient or cost effective the targeting dimensions for the digital-content campaign can be according to the budget goal 204. To illustrate, the content-campaign-prediction system 106 may determine that when the targeting dimensions include the geographical audience segment 206 as including the two cities "Los Angeles, Calif." and "Sacramento, Calif.," the digital-content campaign can approximately utilize the full extent of the budget goal 204. In contrast, the content-campaign-prediction system 106 may determine that when the targeting dimensions include a geographical audience segment limited to "Los Angeles, Calif.," the digital-content campaign may under-utilize the budget goal 204. Thus, the content-campaign-prediction system 106 can intelligently predict if targeting dimensions will over constrain the digital-content campaign such that budget goal 204 is not met, and conversely if targeting dimensions will under constrain the digital-content campaign such that the budget goal 204 is exceeded.

Based on receiving the targeting dimensions and the one or more expenditure constraints at act 202, the content-campaign-prediction system 106 can subsequently generate corresponding tuple sketches (e.g., clearing-bid-tuple sketches 212 and bid-success-rate-tuple sketches 216). Having generated such tuple sketches, the content-campaign-prediction system 106 can apply multi-dimensional set operations to clearing-bid-tuple sketches 210 and bid-success-rate-tuple sketches 214 previously generated by the content-campaign-prediction system 106 based on historical auction data. Specifically, using a sketch generator implementing a running-average-tuple-sketch algorithm, the content-campaign-prediction system 106 can apply set intersections based on the targeting dimensions (e.g., the geographical audience segment 206 and a site-type segment for "tier 1" sites) to generate the clearing-bid-tuple sketches 212 and the bid-success-rate-tuple sketches 216.

Based on the clearing-bid-tuple sketches 212 and the bid-success-rate-tuple sketches 216, the content-campaign-prediction system 106 at act 218 can determine a distribution of clearing-bid values 220 and a distribution of bid-success rates 222. For example, the content-campaign-prediction system 106 can extract values (including values not illustrated) from the clearing-bid-tuple sketches 212 and the bid-success-rate-tuple sketches 216 to respectively generate the distribution of clearing-bid values 220 and the distribution of bid-success rates 222. In some embodiments, the content-campaign-prediction system 106 can generate the distribution of clearing-bid values 220 and the distribution of bid-success rates 222 based on a bid count corresponding to the extracted values. Thus, as more bids from auctions correspond to a particular clearing-bid value or particular bid-success rate, the content-campaign-prediction system 106 can reflect a higher bid count (and likewise for other bid counts) in the distribution of clearing-bid values 220 and the distribution of bid-success rates 222.

Subsequently, the content-campaign-prediction system 106 can perform various operations at act 224 based on the distribution of clearing-bid values 220 and the distribution of bid-success rates 222 to generate predicted campaign values 226. For example, to generate a predicted cost per quantity of impressions 228, the content-campaign-prediction system 106 can analyze the distribution of clearing-bid values 220. Similarly, to generate a predicted number of impressions 230, the content-campaign-prediction system 106 can analyze the distribution of bid-success rates 222.

For example, in some implementations, the content-campaign-prediction system 106 generates the predicted cost per quantity of impressions 228 by determining an average clearing-bid value based on the distribution of clearing-bid values 220—as part of a running-average-tuple-sketch algorithm. Similarly, in some cases, the content-campaign-prediction system 106 generates the predicted number of impressions 230 by determining an average bid-success rate based on the distribution of bid-success rates 222 and multiplying the average bid-success rate by a bid count—as part of a running-average-tuple-sketch algorithm. In some such embodiments, the bid count is a predetermined bid count, a total bid count from the distribution of bid-success rates 222, a winning bid-count, or a modified total bid count excluding bids in excess of a max-bid value.

As further indicated by FIG. 2, the content-campaign-prediction system 106 can generate a predicted expenditure 232 for the digital-content campaign (e.g., by multiplying the predicted cost per quantity of impressions 228 and the predicted number of impressions 230). Subsequently, the content-campaign-prediction system 106 can provide the predicted campaign values 226 (and/or others) to a campaign-prediction interface (e.g., of an administrator device for modifying targeting dimensions and/or expenditure constraints or else submitting a request for implementing the digital-content campaign).

Figure 3A:
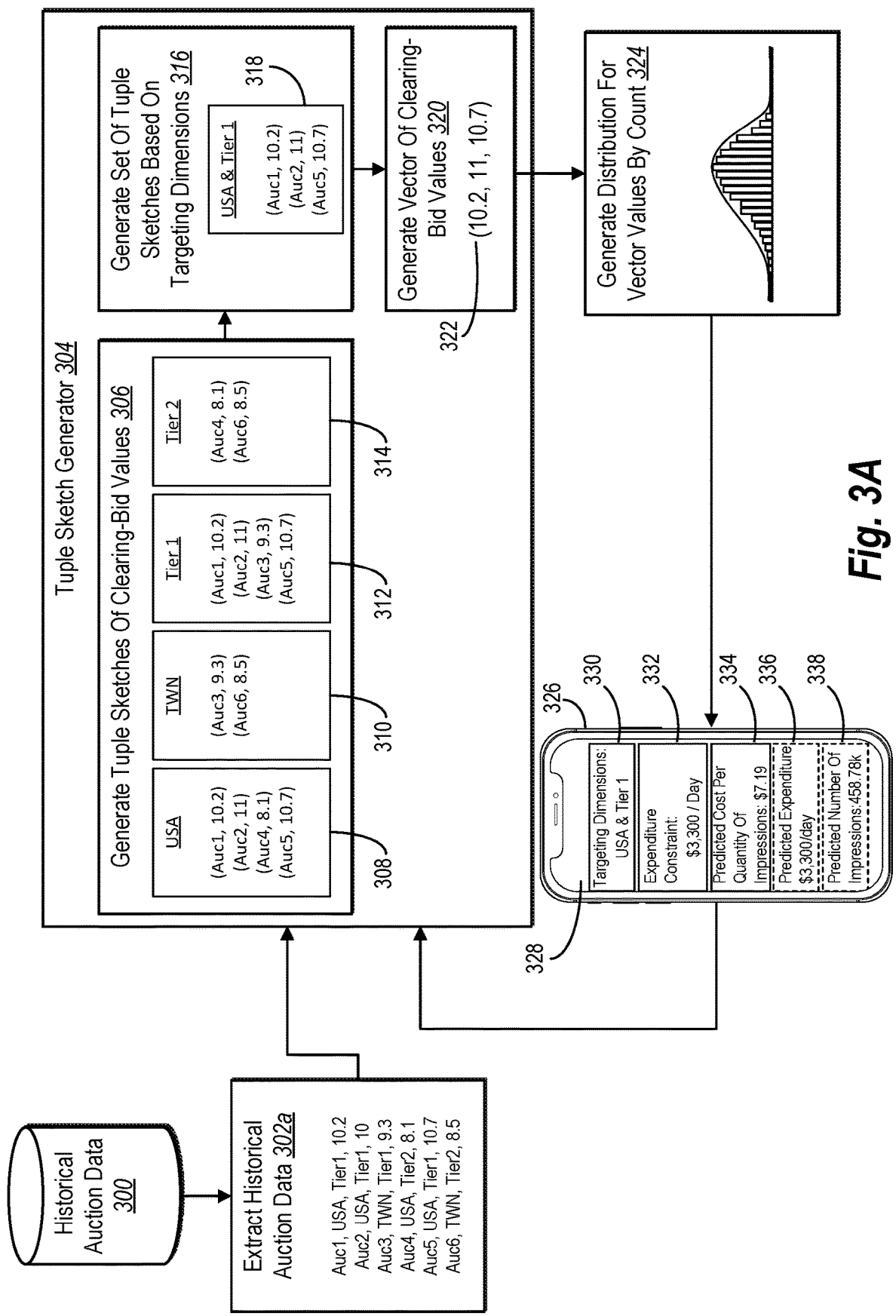
FIGS. 3A-3B illustrate a content-campaign-prediction system utilizing a tuple sketch generator to generate predicted values for a digital-content campaign in accordance with one or more embodiments.
Figure 3B:
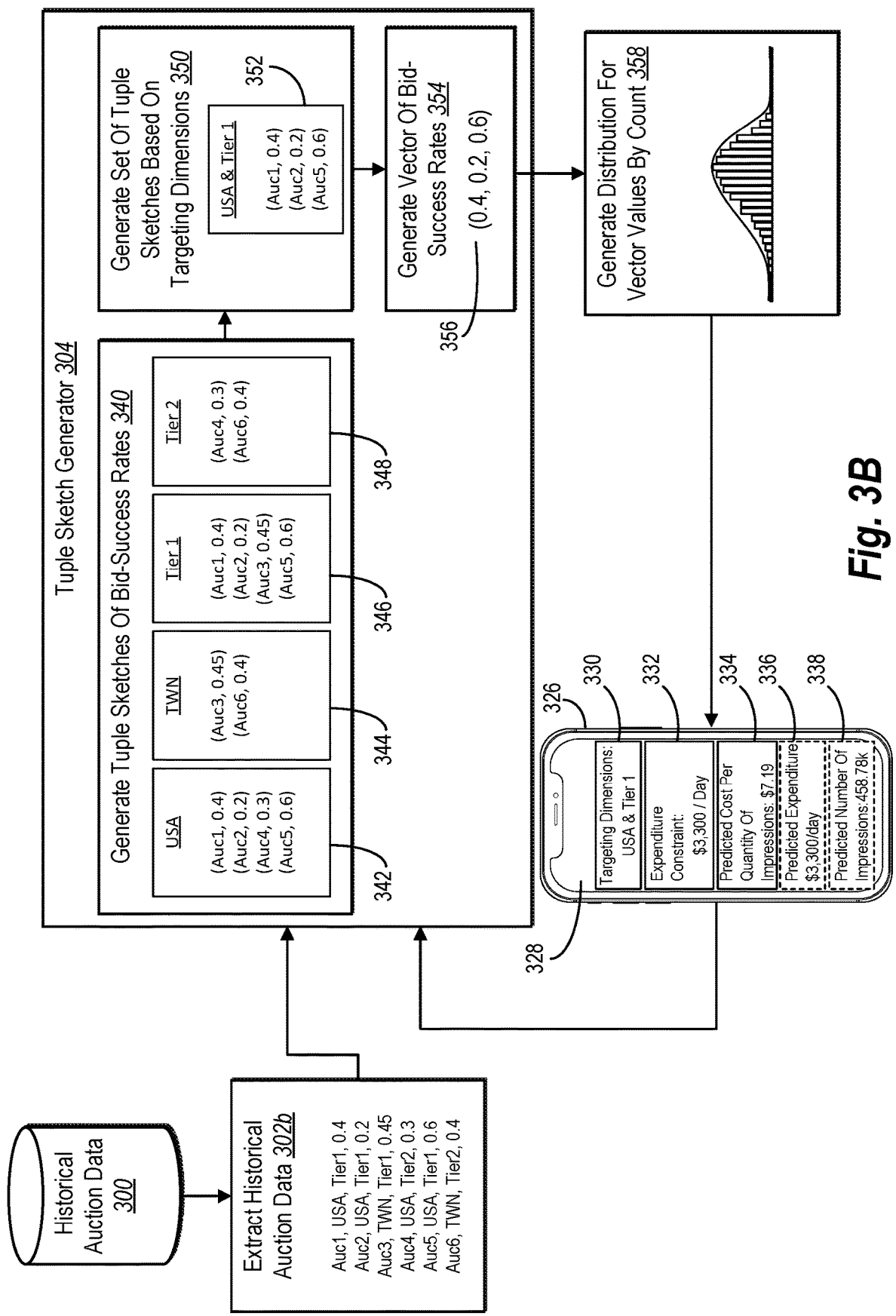

As mentioned above, the content-campaign-prediction system 106 can dynamically generate content-campaign predictions for multi-dimensional targeting criteria. FIGS. 3A-3B illustrate the content-campaign-prediction system 106 utilizing a tuple sketch generator 304 to generate predicted values for a digital-content campaign in accordance with one or more embodiments. As shown in FIG. 3A, the content-campaign-prediction system 106 can manage a data store comprising historical auction data 300. Additionally or alternatively, the content-campaign-prediction system 106 can access a data store of a third-party server (e.g., an ad exchange server) comprising the historical auction data 300.

At act 302a, the content-campaign-prediction system 106 extracts, in whole or in part, the historical auction data 300. For example, in some embodiments, the content-campaign-prediction system 106 can mine auction information from the historical auction data 300 utilizing one or more data mining techniques (e.g., that involve classifications, decision trees, statistical analyses, machine-learning models, and the like). In these or other embodiments, the content-campaign-prediction system 106 can extract historical auction data at act 302a at various times (e.g., on a rolling basis or else on a batch-basis every few minutes/hours, every twelve hours, every twenty-four hours, every other day). The extracted historical auction data may, in any suitable format, include digital auctions, targeting dimensions, clearing-bid values, bid-success rates, metadata, etc. By way of example, FIG. 3A depicts the extracted historical auction data as comprising data for six digital auctions, denoted by digital auction identifiers "Auc1" through "Auc6." In addition, each digital auction is associated with two targeting dimensions (country and site tier) along with a clearing-bid value.

As further shown in FIG. 3A, the content-campaign-prediction system 106 can then apply the tuple sketch generator 304 to the extracted historical auction data. At act 306, the tuple sketch generator 304 can generate tuple sketches of clearing-bid values (e.g., for subsequent use in predicting campaign values). For example, the tuple sketch generator 304 can use a running-average-tuple-sketch algorithm. In some implementations, the running-average-tuple-sketch algorithm comprises a tuple sketch algorithm from Apache DataSketch of the Apache DataSketches library archived for download at datasketches.apache.org/docs/Tuple/TupleOverview.html, the entire contents of which are expressly incorporated herein by reference.

As described in a Tuple Sketch Overview by Apache DataSketches library, a Tuple Sketch is an extension of a Theta Sketch. A Theta Sketch can be represented internally as an array of hash values (of unique identifiers) and a value, that latter of which representing theta. As theta, the value represents an effective sampling rate determined by the sketch. A Theta Sketch is a generalization of a k-minimum value algorithm (referred to as a "KMV" algorithm or a "bottom-k sketch") as a sketch algorithm. Such a Theta Sketch represents a limited "KMV perspective" on how θ gets assigned.

As part of performing a running-average-tuple-sketch algorithm, in some implementations, the content-campaign-prediction system 106 applies a tuple sketch algorithm from Apache DataSketch, a KMV algorithm, or a version or extension of the tuple sketch algorithm from Apache DataSketch or the KMV algorithm. Such a KMV algorithm or bottom-k sketch is described by Edith Cohen and Haim Kaplan, *Summarizing Data Using Bottom-K Sketches*, In Proceedings of the 26th Annual ACM Symposium on Principles of Distributed Computing (August 2007), p. 225-234 ("Cohen"); by Ziv Bar-Yossef, T. S. Jayram, Ravi Kumar, D. Sivakumar, and Luca Trevisan, *Counting Distinct Elements in a Data Stream*, in Rolim J. D. P., Vadhan S. (eds.) Randomization and Approximation Techniques in Computer Science, RANDOM 2002 ("Bar-Yossef"); or by datasketches.apache.org/docs/Theta/ThetaSketchFramework.html ("ThetaSketchFramework"). The entire contents of Cohen, Bar-Yossef, and ThetaSketchFramework are expressly incorporated herein by reference.

As indicated above, in some implementations, the content-campaign-prediction system 106 extends the tuple sketch algorithm from Apache DataSketch (or a version of the KMV algorithm) as part of the running-average-tuple-sketch algorithm to generate customized sketching objects or sketches with customized summary values. Such customized summary values may include, for example, digital auction identifiers and clearing-bid values. As explained further below, the content-campaign-prediction system 106 subsequently uses such customized summary objects to generate a probabilistic distribution of information, such as probabilistic distributions for clearing-bid values or bid-success rates. As examples of such customized summary objects, with the running-average-tuple-sketch algorithm, the tuple sketch generator 304 can generate sets of tuple sketches 308-314, each comprising tuple sketches with a digital auction identifier and a clearing-bid value. As shown in FIG. 3A, in some embodiments, the tuple sketch generator 304 generates sets of tuple sketches 308-314 according to targeting dimensions (e.g., countries "USA" and "TWN" and site tiers "Tier 1" and "Tier 2") identified from extracting the historical auction data at act 302a.

In addition, although omitted for clarity in the figures, in certain implementations, the tuple sketch generator 304 hashes digital auction identifiers for each digital auction as part of generating the sets of tuple sketches 308-314. In so doing, the tuple sketch generator 304 can associate a clearing-bid value (or a bid-success rate) with a corresponding hash value that respectively represents a digital auction identifier in each tuple sketch of the sets of tuple sketches 308-314.

After generating the sets of tuple sketches 308-314 at act 306, the content-campaign-prediction system 106 can receive indications of user input from a computing device 326 via a campaign-prediction interface 328 providing targeting dimensions 330 and an expenditure constraint 332. In these or other embodiments, the targeting dimensions 330 from the computing device 326 may include at least one of a geographical audience segment, a digital service audience segment, or a site-type segment. For example, as shown in FIG. 3A, the targeting dimensions 330 includes a geographical audience segment of the country "USA" and a site-type segment of "Tier 1." Similarly, for example, the expenditure constraint 332 includes a value of "$3,330/day."

In response to receiving the user input from the computing device 326, the content-campaign-prediction system 106 can utilize the tuple sketch generator 304 to perform an act 316 to generate a set of tuple sketches 318 comprising values from an auction dataset that satisfy the targeting dimensions 330 (e.g., "USA" and "Tier 1"). In some embodiments, the content-campaign-prediction system 106 performs one or more pre-processing steps for filtering out irrelevant tuple sketches. As part of the preprocessing, the content-campaign-prediction system 106 identifies the set of tuple sketches 308 and the set of tuple sketches 312 that respectively correspond to the targeting dimensions 330 of "USA" and "Tier 1." Subsequently, the content-campaign-prediction system 106 may perform a tuple sketch algorithm on the relevant sets of tuple sketches 308, 312. In the alternative, the content-campaign-prediction system 106 may perform act 316 to generate the set of tuple sketches 318 based on the targeting dimensions 330 by applying a running-average-tuple-sketch algorithm to each of the sets of tuple sketches 308-314.

In addition to (or as part of) applying a tuple sketch algorithm to one or more of the sets of tuple sketches 308-314, the content-campaign-prediction system 106 can perform multi-dimensional set operations to generate the set of tuple sketches 318 based on the targeting dimensions 330. For example, the content-campaign-prediction system 106 can perform an intersection operation (e.g., "USA"∩"Tier 1") to identify the tuple sketches common to both of the set of tuple sketches 308 and the set of tuple sketches 312. Based on the applied set operation(s), the content-campaign-prediction system 106 can identify the set of tuple sketches 318 as comprising three tuple sketches: "(Auc1, 10.2)," "(Auc2, 11)," and "(Auc5, 10.7)." Additionally or alternatively, the content-campaign-prediction system 106 can apply myriad other set operations (and in various combinations) according to the targeting dimensions 330. For example, if the targeting dimensions 330 comprise an excluded segment (e.g., "Not California"), the content-campaign-prediction system 106 can perform a combination of an intersection operation and a difference operation (e.g., ["USA"∩"Tier 1"]—"California").

After generating the set of tuple sketches 318 based on the targeting dimensions 330 at act 316, the content-campaign-prediction system 106 can generate a vector 322 of clearing-bid values (e.g., an intersection of tuple sketches for clearing-bid values) at act 320. For example, the content-campaign-prediction system 106 can extract clearing-bid values from the auction dataset satisfying the targeting dimensions 330, namely the set of tuple sketches 318. To illustrate, the content-campaign-prediction system 106 can utilize the tuple sketch generator 304 to extract the clearing-bid values of "10.2," "11," and "10.7" from the set of tuple sketches 318 to create a data string as the vector 322 shown in FIG. 3A.

At act 324, the content-campaign-prediction system 106 can generate a distribution (e.g., an empirical distribution) of clearing-bid values from the vector 322. In particular, the content-campaign-prediction system 106 can generate a distribution of the clearing-bid values from the vector 322 based on each count or instance of a given clearing-bid value from the vector 322. Accordingly, the content-campaign-prediction system 106 can, in general, reflect less prevalent clearing-bid values from the vector 322 towards an outer portion of the distribution of clearing-bid values and more prevalent clearing-bid values from the vector 322 towards a central portion of the distribution of clearing-bid values.

In some embodiments, act 324 comprises determining a distribution curve of clearing-bid values based on a count of the clearing-bid values from the vector 322. To illustrate, the content-campaign-prediction system 106 may determine a function fitted to the clearing-bid values from the vector 322. In these or other embodiments, to determine the distribution curve, the content-campaign-prediction system 106 identifies a function that best represents (e.g., within a threshold R-squared value) the clearing-bid values from the vector 322. In some embodiments, the content-campaign-prediction system 106 may select an exponential function, linear function, logarithmic function, polynomial function (e.g., of 2nd order), power function, moving average function, etc. Additionally or alternatively, to determine the distribution curve, the content-campaign-prediction system 106 applies a distribution algorithm (e.g., from a library of distribution functions) to the clearing-bid values from the vector 322.

From the distribution of clearing-bid values, the content-campaign-prediction system 106 can generate, for display within the campaign-prediction interface 328 of the computing device 326, a predicted cost per quantity of impressions 334. To do so, the content-campaign-prediction system 106 can quantify an area under the distribution curve of the distribution of clearing-bid values to determine an average clearing-bid value.

In some embodiments, for example, the content-campaign-prediction system 106 generates a predicted cost per quantity of impressions according to the following function:

$e\widehat{CPM} = \int_0^{max\text{-}bid} p \, d \, \hat{F}_n(p|t.c.)$, where the term "$e\widehat{CPM}$" refers to a predicted, effective cost per thousand impressions or digital-content placements; the term "p" refers to a particular clearing-bid value from "n" number of auctions satisfy targeting criteria or dimensions "t.c."; the terms "p $d\hat{F}_n$" refer to a clearing-bid value as function of an empirical distribution of clearing-bid values "$\hat{F}_n$," the term "max-bid" refers to ta max-bid value as an upper bound of the closed integral, and the terms "$d\hat{F}_n(p|t.c)$" together refer to an empirical distribution according to the targeting criteria or dimensions. In at least some embodiments, the foregoing function is expressed using the Lebesgue Stieltjes integration format.

To illustrate, the content-campaign-prediction system 106 can perform a truncated integration of the distribution curve over a clearing-bid-value interval from zero to a max-bid value (e.g., where an x-axis defines clearing-bid values and a y-axis defines count). Accordingly, the content-campaign-prediction system 106 can perform truncated integration over a clearing-bid-value interval to identify an approximate sum total cost per quantity of impressions based on clearing-bid values of the vector 322 that do not exceed a max-bid value. Subsequently, to determine an estimated value (e.g., an average clearing-bid value) as the predicted cost per quantity of impressions 334, the content-campaign-prediction system 106 in some implementations divide the approximate total cost per quantity of impressions by a count of the summed clearing-bid values. In other implementations, the format of the truncated integral and the determined area under the distribution curve accounts for a bid count, and therefore no division is needed.

In the alternative to generating a distribution at act 324 and performing a truncated integration, in some embodiments, the content-campaign-prediction system 106 foregoes generating a distribution altogether. Instead, the content-campaign-prediction system 106 can generate the predicted cost per quantity of impressions 334 by summing the clearing-bid values of the vector 322 which do not exceed a max-bid value and dividing the total by the number of corresponding clearing-bid values.

Further, in some embodiments, the content-campaign-prediction system 106 can iterate one or more of the foregoing acts or algorithms. For example, the content-campaign-prediction system 106 can iterate in response to user interaction indicating additional or alternative targeting dimensions 330, expenditure constraints 332, etc. via the campaign-prediction interface 328. Specifically, in response to receiving such user input, the content-campaign-prediction system 106 can generate an updated vector 322 of clearing-bid values (e.g., an updated intersection of tuple sketches for clearing-bid values) in the manner described above utilizing the tuple sketch generator 304. Subsequently, the content-campaign-prediction system 106 can provide, for display at the campaign-prediction interface of the computing device 326, an updated predicted cost per quantity of impressions 334 for the digital-content campaign (e.g., based on an updated distribution of clearing-bid values as also described above).

Similarly, the content-campaign-prediction system 106 can iterate one or more of the foregoing acts or algorithms in response to receiving (e.g., extracting) additional clearing-bid values from the historical auction data 300 or from updated historical auction data. For example, the content-campaign-prediction system 106 can modify one or more of the sets of tuple sketches 308-314 at act 306 to include additional tuple sketches. Subsequently, the content-campaign-prediction system 106 can modify or update the set of tuple sketches 318 at act 316 to reflect an updated auction dataset that satisfies the targeting dimensions. Further, and as described above, the content-campaign-prediction system 106 can determine a modified distribution of clearing-bid values based on updated values of the vector 322. In turn, the content-campaign-prediction system 106 can generate, for display by the computing device 326, an updated predicted cost per quantity of impressions 334 for the digital-content campaign (e.g., based on an updated distribution of clearing-bid values as also described above).

As further shown in FIG. 3A, the content-campaign-prediction system 106 can generate, for display by the computing device 326, a predicted expenditure 336 and a predicted number of impressions 338. These values are discussed further below in relation to FIG. 3B.

As shown in FIG. 3B, the content-campaign-prediction system 106 can perform the same or similar acts and algorithms described above, but in relation to bid-success rates for generating the predicted number of impressions 338. In addition, the content-campaign-prediction system 106 can perform the acts and algorithms of FIG. 3B at the same time or at different times than performed for the acts and algorithms of FIG. 3A. For instance, FIG. 3B depicts the content-campaign-prediction system 106 extracting historical auction data at act 302b. In some embodiments, the historical auction data extracted at act 302b includes different historical auction data than the historical auction data extracted at act 302a. For example, FIG. 3B shows the content-campaign-prediction system 106 extracting historical auction data comprising bid-success rates in association with two targeting dimensions (country and site tier) for each digital auction. In contrast, the content-campaign-prediction system 106 in FIG. 3A extracts historical auction data comprising clearing-bid values. The content-campaign-prediction system 106 can then apply the tuple sketch generator 304 to the bid-success rates extracted from the historical auction data 300 (e.g., utilizing a running-average-tuple-sketch algorithm).

As noted above, in some implementations, the content-campaign-prediction system 106 extends the tuple sketch algorithm from Apache DataSketch (or a version of the KMV algorithm) as part of the running-average-tuple-sketch algorithm to generate customized sketching objects or sketches with customized summary values. Such customized summary values may include, for example, digital auction identifiers and bid-success rates. As shown in FIG. 3B, for instance, the tuple sketch generator 304 generates tuple sketches of bid-success rates at act 340 (e.g., for subsequent use in predicting campaign values) based on the extracted historical auction data. In some embodiments, the tuple sketch generator 304 generates sets of tuple sketches 342-348 according to the targeting dimensions (e.g., countries "USA" and "TWN" and site tiers "Tier 1" and "Tier 2") identified from extracting the historical auction data at act 302b.

After generating the sets of tuple sketches 342-348 at act 340, the content-campaign-prediction system 106 can receive indications of user input from the computing device 326 via the campaign-prediction interface 328. Specifically, in some cases, the content-campaign-prediction system 106 receives data representing the targeting dimensions 330 and the expenditure constraint 332 from the computing device 326. As similarly discussed above, in response to receiving the user input from the computing device 326, the content-campaign-prediction system 106 can utilize the tuple sketch generator 304 to perform an act 350 to generate a set of tuple sketches 352 comprising values from an auction dataset that satisfy the targeting dimensions 330 (e.g., "USA" and "Tier 1"). To do so, the content-campaign-prediction system 106 can apply a running-average-tuple-sketch algorithm to one or more of the sets of tuple sketches 342-348 as described above (e.g., based on the targeting dimensions 330).

Additionally or as part of applying a tuple sketch algorithm to one or more of the sets of tuple sketches 342-348, the content-campaign-prediction system 106 can, utilizing the tuple sketch generator 304, perform multi-dimensional set operations to generate the set of tuple sketches 352 based on the targeting dimensions 330. For example, as similarly described above, the content-campaign-prediction system 106 can cause the tuple sketch generator 304 to perform an intersection operation (e.g., "USA"∩"Tier 1") to identify the tuple sketches common to both of the set of tuple sketches 342 and the set of tuple sketches 346. Based on the applied set operation(s), the content-campaign-prediction system 106 can identify the set of tuple sketches 352 as comprising three tuple sketches: "(Auc1, 0.4)," "(Auc2, 0.2)," and "(Auc5, 0.6)."

In a same or similar manner as described above, the content-campaign-prediction system 106 can generate a vector 356 of bid-success rates (e.g., an intersection of tuple sketches for bid-success rates) at act 354 that satisfies the targeting dimensions. To illustrate, the content-campaign-prediction system 106 can utilize the tuple sketch generator 304 to extract the bid-success rates of "0.4," "0.2," and "0.6" from the set of tuple sketches 352 to create a data string as the vector 356 shown in FIG. 3B.

At act 358, the content-campaign-prediction system 106 can generate a distribution (e.g., an empirical distribution) of bid-success rates from the vector 356. For example, as described above, the content-campaign-prediction system 106 can generate a distribution of bid-success rates based on each count or instance of a given bid-success rate from the vector 356.

Based on the distribution of bid-success rates, the content-campaign-prediction system 106 can generate, for display within the campaign-prediction interface 328 of the computing device 326, the predicted number of impressions 338. To do so, the content-campaign-prediction system 106 can quantify an area under a distribution curve of the distribution of bid-success rates to determine an average bid-success rate, for example, according to the following example expression: $\widehat{imps}$ =bid count*$\int r \, d\, \widehat{G_n}$ (r|t.c.), where the term "$\widehat{imps}$" refers to a predicted number of impressions, the term "r" refers to a bid-success rate (e.g., a value of 1 or 0), from "n" number of auctions satisfy targeting criteria or dimensions "t.c.," the term "r d $\widehat{G_n}$" refers to a bid-success rate as function of an empirical distribution of bid-success rates "$\widehat{G_n}$," and the term "bid count" refers to a number of bids. Collectively, the term "$d\widehat{G_n}$(r|t.c.)" refers to the probability mass under each value.

To illustrate, the content-campaign-prediction system 106 can perform integration (e.g., an open-interval integration) of a function representing the bid-success rates of the vector 356 to determine an approximate sum total of bid-success rates. Under a resulting or assumed Bernoulli distribution, an estimated value of the bid-success rate p takes the form of (1*p1)+(0*p2)=p, where the term "p1" is a win probability and the term "p2" is a loss probability. In turn, the content-campaign-prediction system 106 can generate the predicted number of impressions 338 by multiplying the estimated bid-success rate by a bid count (e.g., a predetermined/projected bid count, a winning bid-count, a modified total bid count excluding bids in excess of a max-bid value). Subsequently, to determine an estimated value (e.g., an average bid-success rate), the content-campaign-prediction system 106 can divide the approximate total bid-success rate by a count of the summed bid-success rates. Alternatively, as described above, the content-campaign-prediction system 106 can instead average the bid-success rates of the vector 356 without generating a distribution and/or performing integration.

Based on the values of the predicted cost per quantity of impressions 334 and the predicted number of impressions 338, the content-campaign-prediction system 106 can further generate a predicted expenditure 336 for a digital-content campaign. For example, the content-campaign-prediction system 106 can generate the predicted expenditure 336 by multiplying the predicted cost per quantity of impressions 334 by the predicted number of impressions 338. As shown in FIG. 3B, in some embodiments, the content-campaign-prediction system 106 provides the predicted expenditure 336 for display within the campaign-prediction interface 328 of the computing device 326. Thus, in response to user input at the computing device 326 providing the targeting dimensions 330 and the expenditure constraint 332, the content-campaign-prediction system 106 can dynamically respond by providing, for display, the predicted cost per quantity of impressions 334, the predicted expenditure 336, and the predicted number of impressions 338.

Additionally or alternatively, the content-campaign-prediction system 106 may provide, for display within the campaign-prediction interface 328 of the computing device 326, a difference value between the expenditure constraint 332 and the predicted expenditure 336. In particular, the content-campaign-prediction system 106 may subtract the predicted expenditure 336 from the expenditure constraint 332 to determine the difference value representing how efficient (or inefficient) the digital-content campaign is predicted to become in terms of expenditure.

Further, and as mentioned above, the content-campaign-prediction system 106 can iterate one or more of the foregoing acts or algorithms in some implementations. For example, the content-campaign-prediction system 106 can iterate in response to receiving additional or alternative targeting dimensions 330 or expenditure constraints 332 via the campaign-prediction interface 328. Similarly, the content-campaign-prediction system 106 can iterate one or more of the foregoing acts or algorithms in response to receiving (e.g., extracting) additional bid-success rates from the historical auction data 300.

For example, the content-campaign-prediction system 106 can modify one or more of the sets of tuple sketches 342-348 at act 340 to include additional tuple sketches. Subsequently, the content-campaign-prediction system 106 can modify or update the set of tuple sketches 352 at act 350 to reflect an updated auction dataset that satisfies the targeting dimensions. Further, and as similarly described above, the content-campaign-prediction system 106 can determine a modified distribution of bid-success rates based on updated values of the vector 356. In turn, the content-campaign-prediction system 106 can generate, for display by the computing device 326, an updated predicted number of impressions 338 and/or an updated predicted expenditure 336 for the digital-content campaign (e.g., based on an updated distribution of bid-success rates).

As mentioned above, the content-campaign-prediction system 106 can dynamically generate a predicted cost per quantity of impressions and a predicted number of impressions based on user input. In accordance with one or more embodiments of the present disclosure, FIGS. 4A-H illustrate graphical user interfaces 402a-402h on a computing device 400 for implementing the content-campaign-prediction system 106. As explained below, the content-campaign-prediction system 106 provides predicted values for a digital-content campaign in response to various user inputs at the graphical user interfaces 402a-402h.

As just suggested, FIGS. 4A-4H depict the computing device 400 comprising a campaign-prediction interface of an administrator application (e.g., the administrator application 114 of an administrator device 112 discussed above in relation to FIG. 1). In some embodiments, the administrator application comprises computer-executable instructions that cause the computing device 400 to perform certain actions depicted in FIGS. 4A-4H, such as presenting a graphical user interface of the administrator application. The actions depicted in FIGS. 4A-4H occur as result of the content-campaign-prediction system 106 performing acts and algorithms described above. For instance, in some embodiments, the content-campaign-prediction system 106 provides data to the computing device 400 for display upon utilizing a sketch generator to generate sets of sketches based on targeting dimensions and historical auction data, determining a distribution of clearing-bid values and bid-success rates from the sets of sketches, and generating a predicted cost per quantity of impressions and a predicted number of impressions. Rather than repeatedly refer to the administrator application or the content-campaign-prediction system 106 as performing the actions depicted in FIGS. 4A-4H below, this disclosure will generally refer to the computing device 400 for simplicity.

Figure 4A:
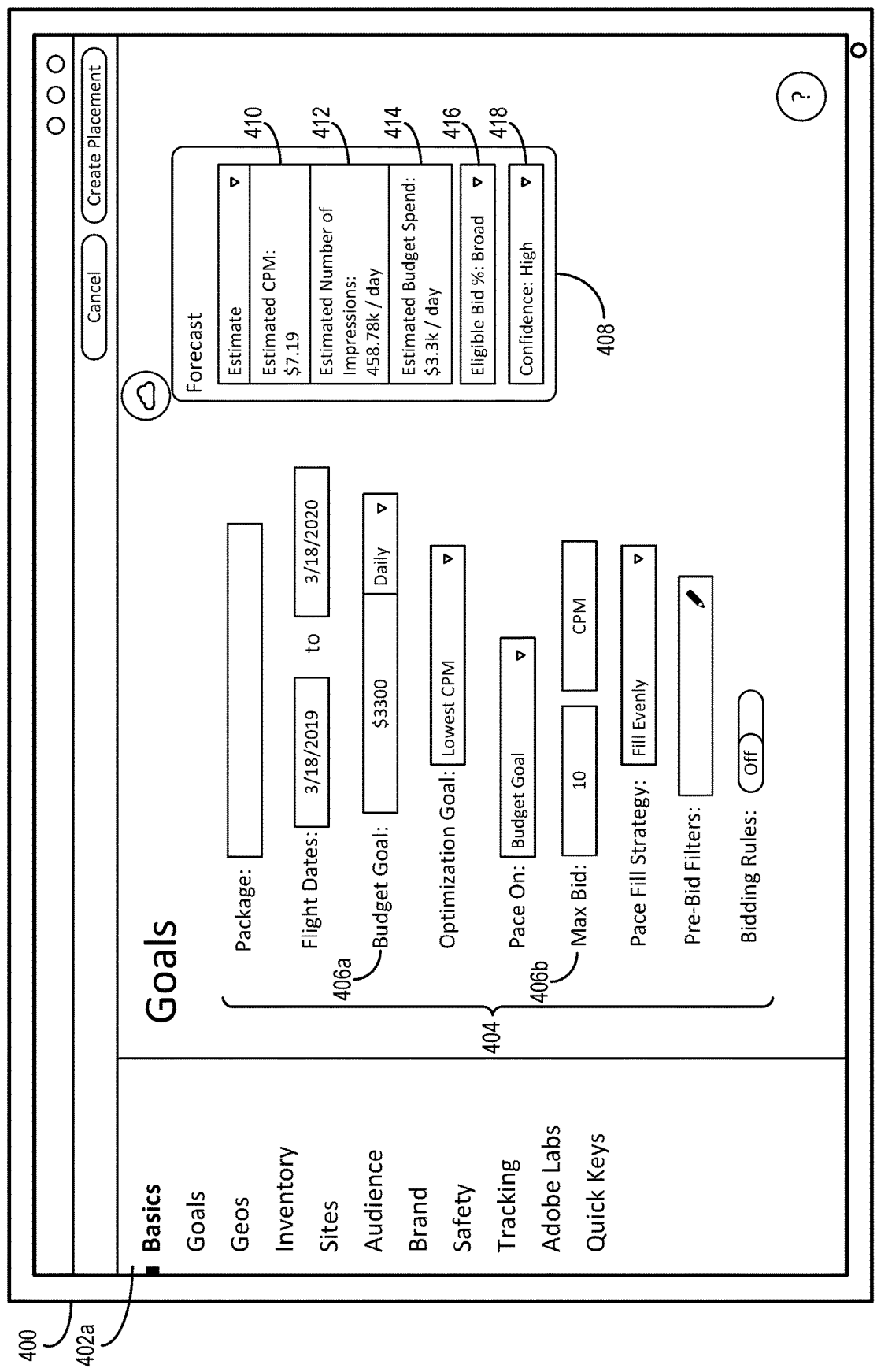

As shown in FIG. 4A, for example, the graphical user interface 402a includes adjustable campaign parameters 404 and a prediction tool 408. In response to user input at the adjustable campaign parameters 404, the computing device 400 can generate various values for display within the prediction tool 408. For example, based on expenditure constraints 406a-406b of the adjustable campaign parameters 404 (and one or more targeting dimensions discussed below in relation to FIGS. 4C-4H), the computing device 400 can populate one or more values for display within the prediction tool 408.

To illustrate, user input through the graphical user interface 402a may include the values of "$3,300" as a daily budget goal for the expenditure constraint 406a and a value of "$10" as a max-bid value for the expenditure constraint 406b. In response to the user input of these values (and targeting dimensions not shown in FIG. 4A), the computing device 400 can generate specific values and indicators for the prediction tool 408. For example, the generated values for the prediction tool 408 may include specific values or indicators for an estimated cost per quantity of impressions 410, an estimated number of impressions 412, an estimated expenditure 414, a utilization efficiency metric 416, and a confidence level 418.

Additionally, in some embodiments, at least some of the values and indicators for the prediction tool 408 may be interrelated. For example, the computing device 400 may return a "high" value for the confidence level 418 when the computing device 400 generates higher amounts of the estimated number of impressions 412. Similarly, the computing device 400 may return a "low" value for the confidence level 418 when the computing device 400 generates lower amounts of the estimated number of impressions 412. As another example, the utilization efficiency metric 416 can change based on a disparity determined between the returned value for the estimated expenditure 414 and the expenditure constraint 406a.

Figure 4B:
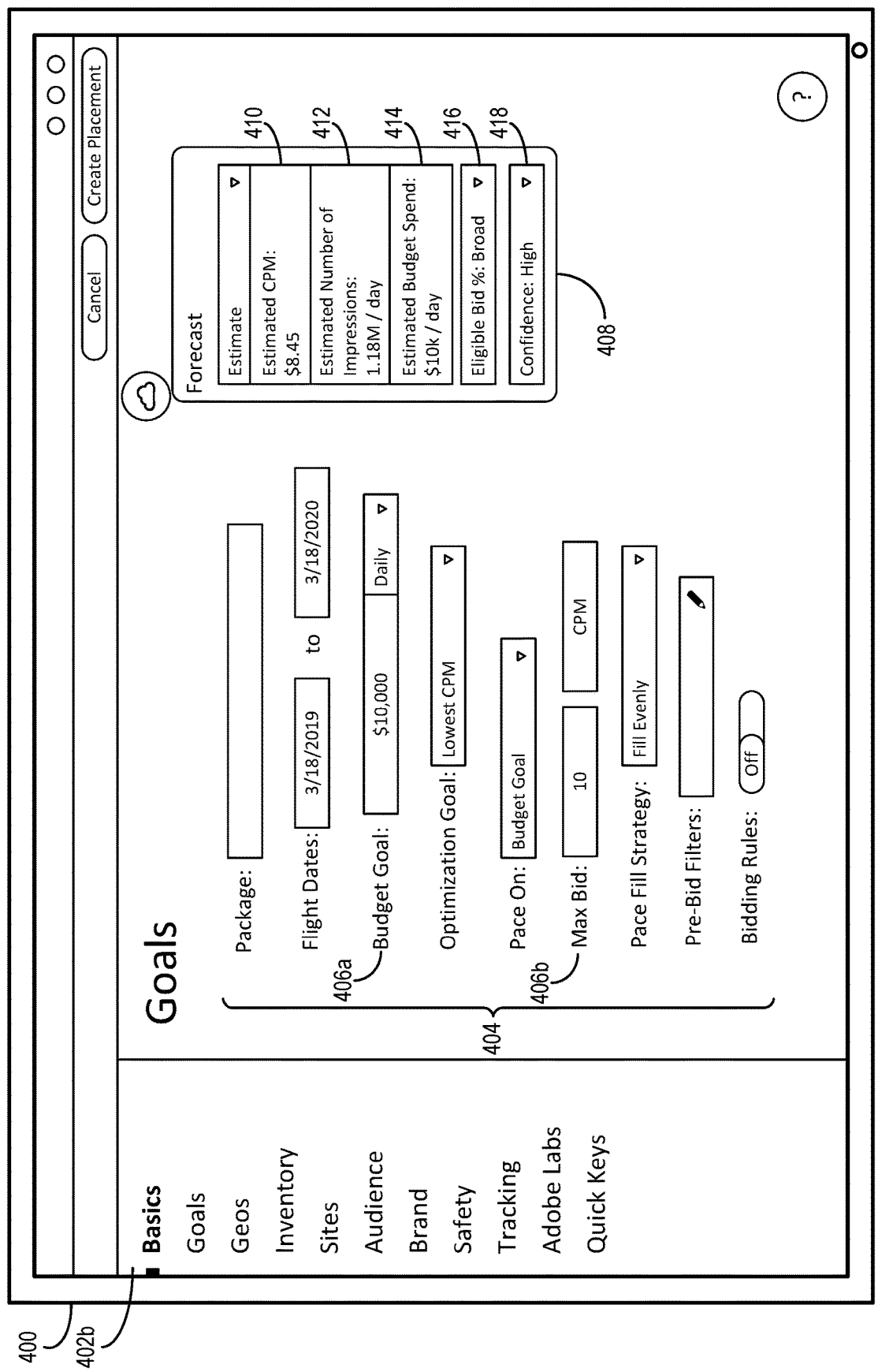

As indicated by the graphical user interface 402b of FIG. 4B, the computing device 400 can dynamically update values for the prediction tool 408. For example, in response to user input at the expenditure constraint 406a to provide a value of "$10,000" in place of the previous value of "$3,300" shown in FIG. 4A, the computing device 400 updates various values for the prediction tool 408 accordingly. Specifically, as shown in FIG. 4B, the computing device 400 updates the estimated cost per quantity of impressions 410 to "$8.45," estimated number of impressions 412 to indicate an updated value of "1.18 M," and the estimated expenditure 414 to indicate an updated value of "$10 k" relative to the values shown in FIG. 4A.

Figure 4C:
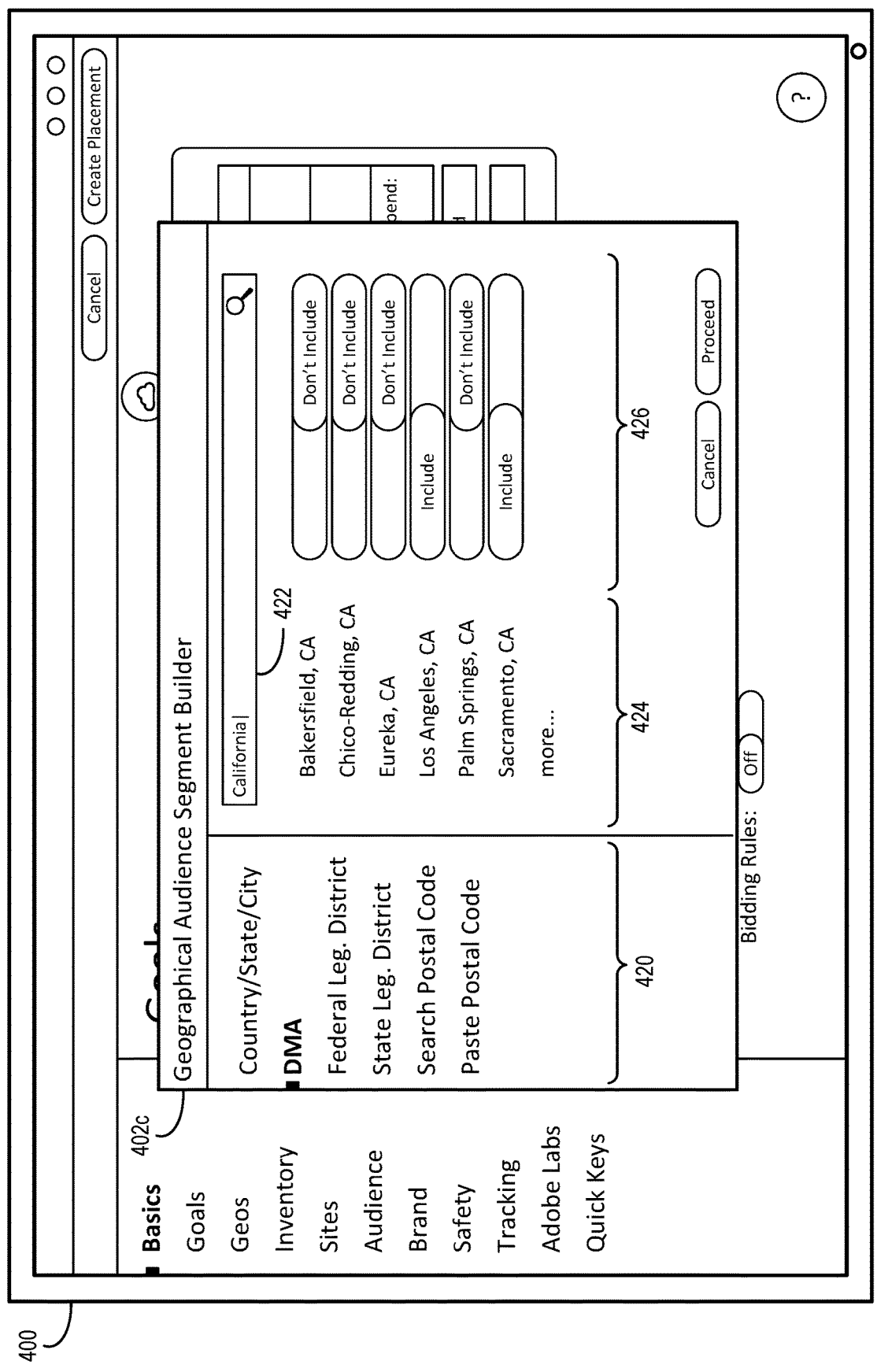

As shown in FIG. 4C, in response to detecting additional user input at the graphical user interface 402b, in some embodiments, the computing device 400 provides for display a graphical user interface 402c. The computing device 400 presenting the graphical user interface 402c for building a geographical audience segment as a specific targeting dimension for a digital-content campaign. In particular, the graphical user interface 402c includes geographical segment categories 420, a search bar 422, segment-search results 424, and segment-inclusion options 426. In these or other embodiments, the geographical segment categories 420 each include a number of geographical segments for user selection as a targeting dimension. For example, as shown for the geographical segment category "DMA" for the search query "California," the computing device 400 selects the geographical audience segments of "Los Angeles, Calif." and "Sacramento, Calif." as targeting dimensions for a digital-content campaign—in response to user input at the segment-inclusion options 426 associated with these audience segments.

Figure 4D:
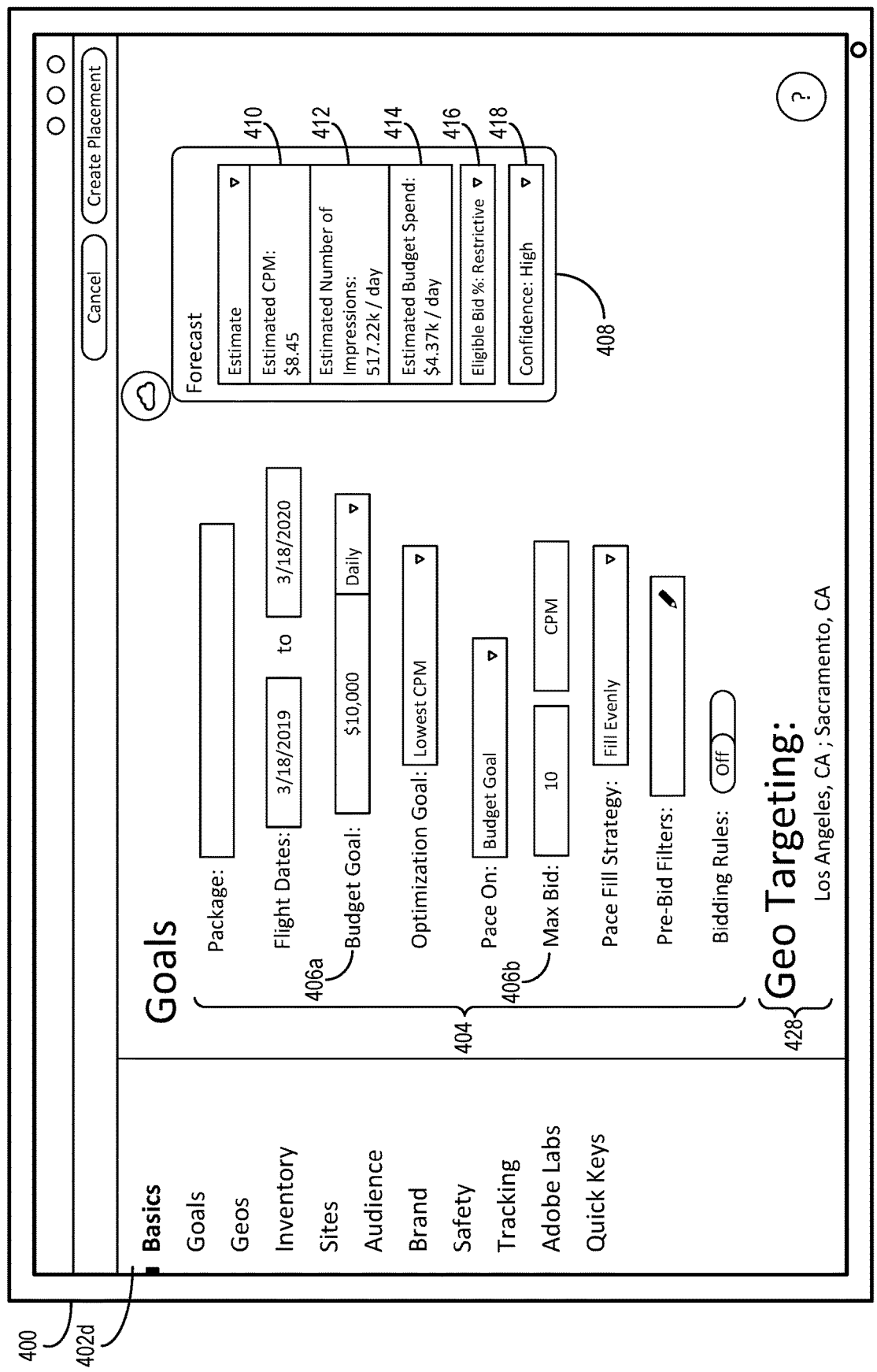

In response to a user selection of one or more targeting dimensions comprising a geographical audience segment via the graphical user interface 402c, the computing device 400 can update the graphical user interface 402b to include a geo-targeting indicator 428, as shown in a graphical user interface 402d of FIG. 4D. Moreover, in response to the geo-targeting indicator 428, the computing device 400 can update the values for the prediction tool 408. As shown in FIG. 4D, the computing device 400 updates the estimated number of impressions 412 to "517.22 k/day," the estimated expenditure 414 to "$4.37 k/day," and the utilization efficiency metric 416 to "restrictive."

Figure 4E:
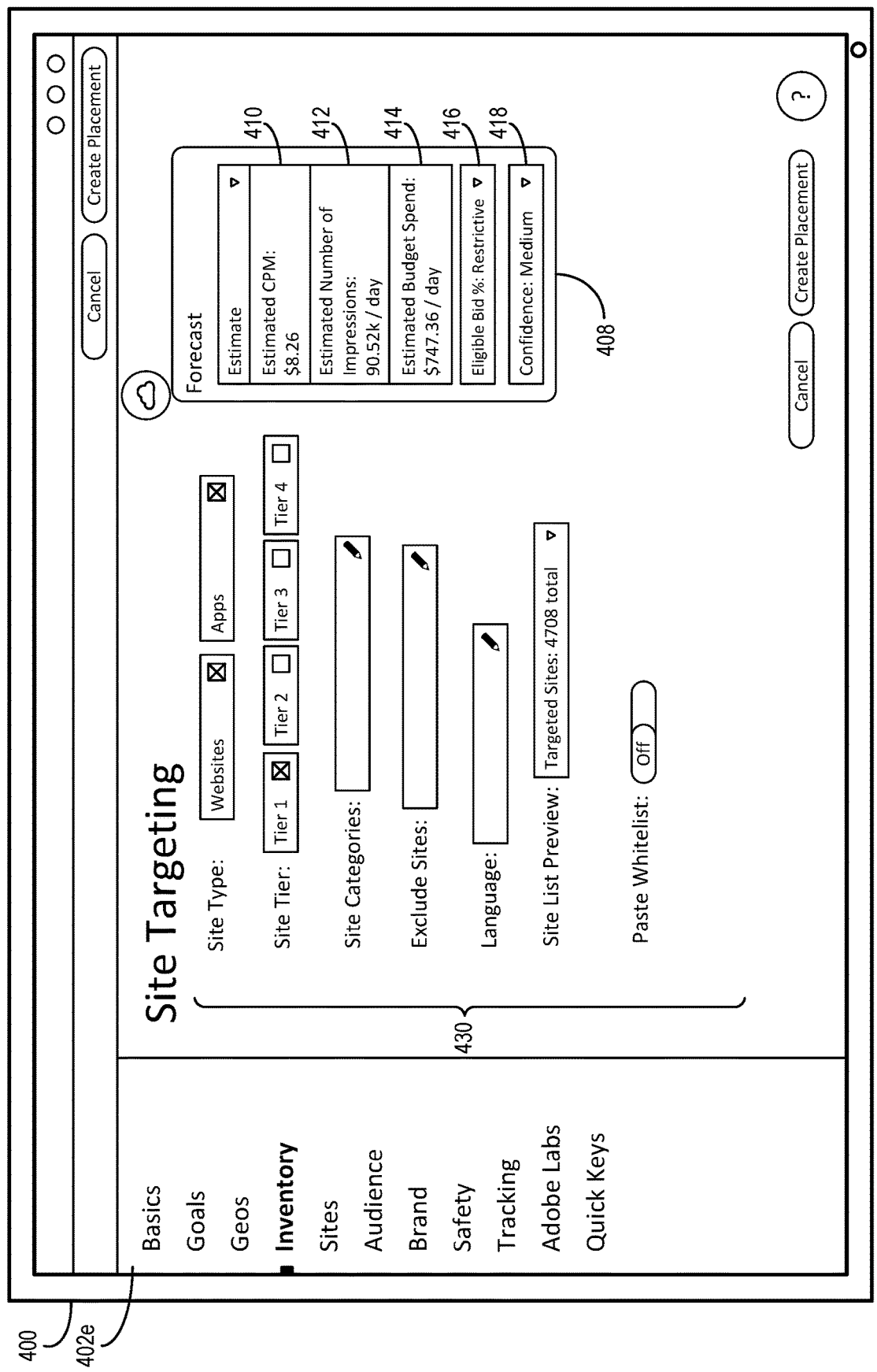

As illustrated in FIG. 4E, the computing device 400 presents a graphical user interface 402e, for example, in response to user input at the graphical user interface 402d to scroll down or dynamically reposition a viewing window. As shown in FIG. 4E, the graphical user interface 402e includes site-type-segment options 430 for identifying one or more site segments to target with digital-content placements. The site-type-segment options 430 include various selectable options for choosing a site type, a site tier, etc., in addition to including digital fields for providing user input to indicate site categories, excluded sites, and language(s) of sites. Moreover, as similarly described above, in response to user input at the graphical user interface 402e, the computing device 400 can dynamically update values for the prediction tool 408. As shown in FIG. 4E, the computing device 400 updates the estimated number of impressions 412 to "90.22 k/day" and the estimated expenditure 414 to "$747.36/day."

Figure 4F:
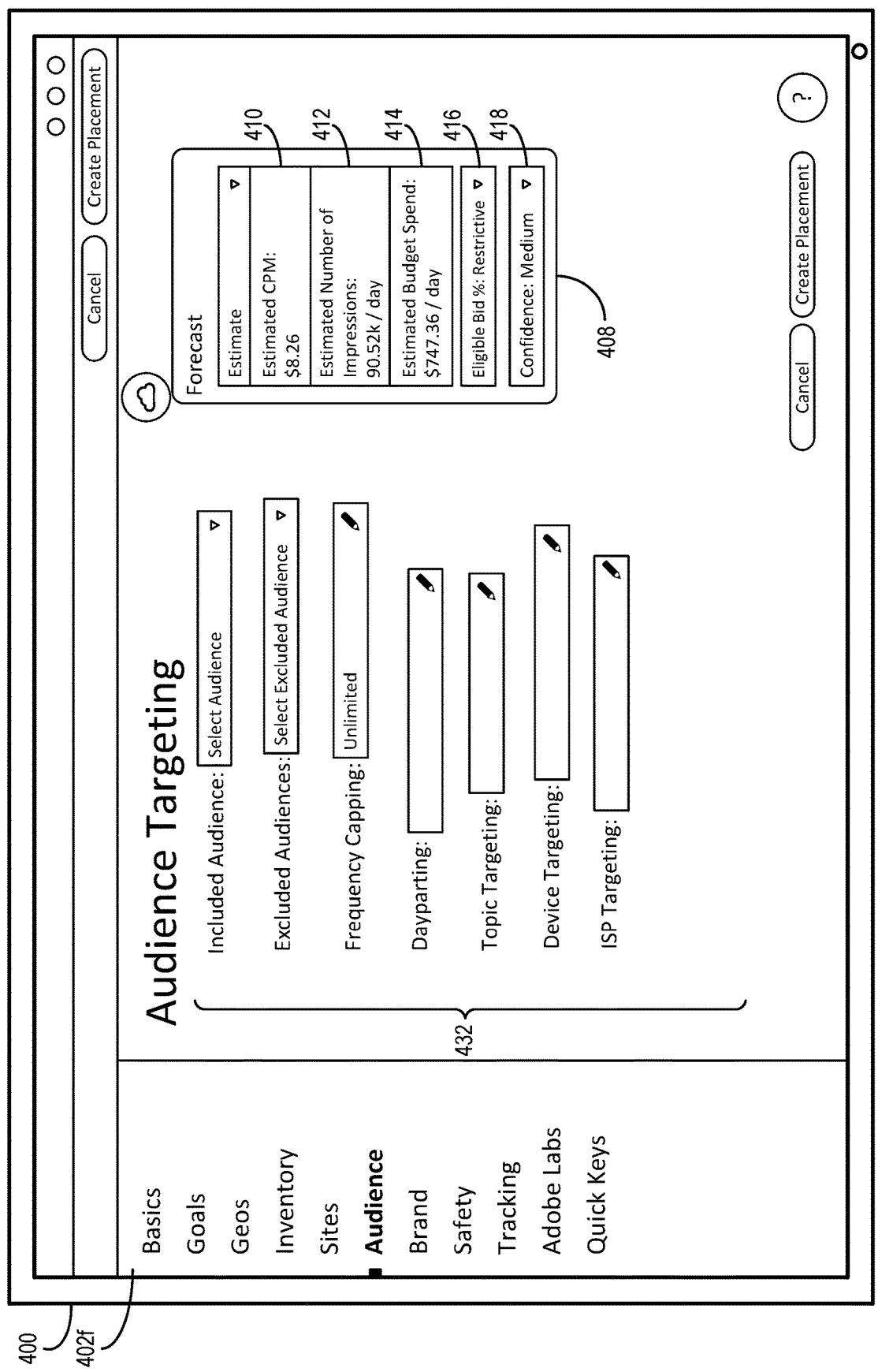

As shown in FIG. 4F, the computing device 400 presents a graphical user interface 402f, for example, in response to user input to scroll down or dynamically reposition a viewing window away from one of the foregoing graphical user interfaces described above. The graphical user interface 402f includes audience-segment options 432 for identifying various audience segments to target and/or exclude in a digital-content campaign. The audience-segment options 432 include selectable options to selectively choose certain audience segments. In addition, the audience-segment options 432 include digital fields for providing user input to indicate various metrics (e.g., frequency capping, dayparting), topic targeting, device-type targeting, and internet service provider targeting. In response to user input at the audience-segment options 432, the computing device 400 can update values for the prediction tool 408 as described above.

Figure 4G:
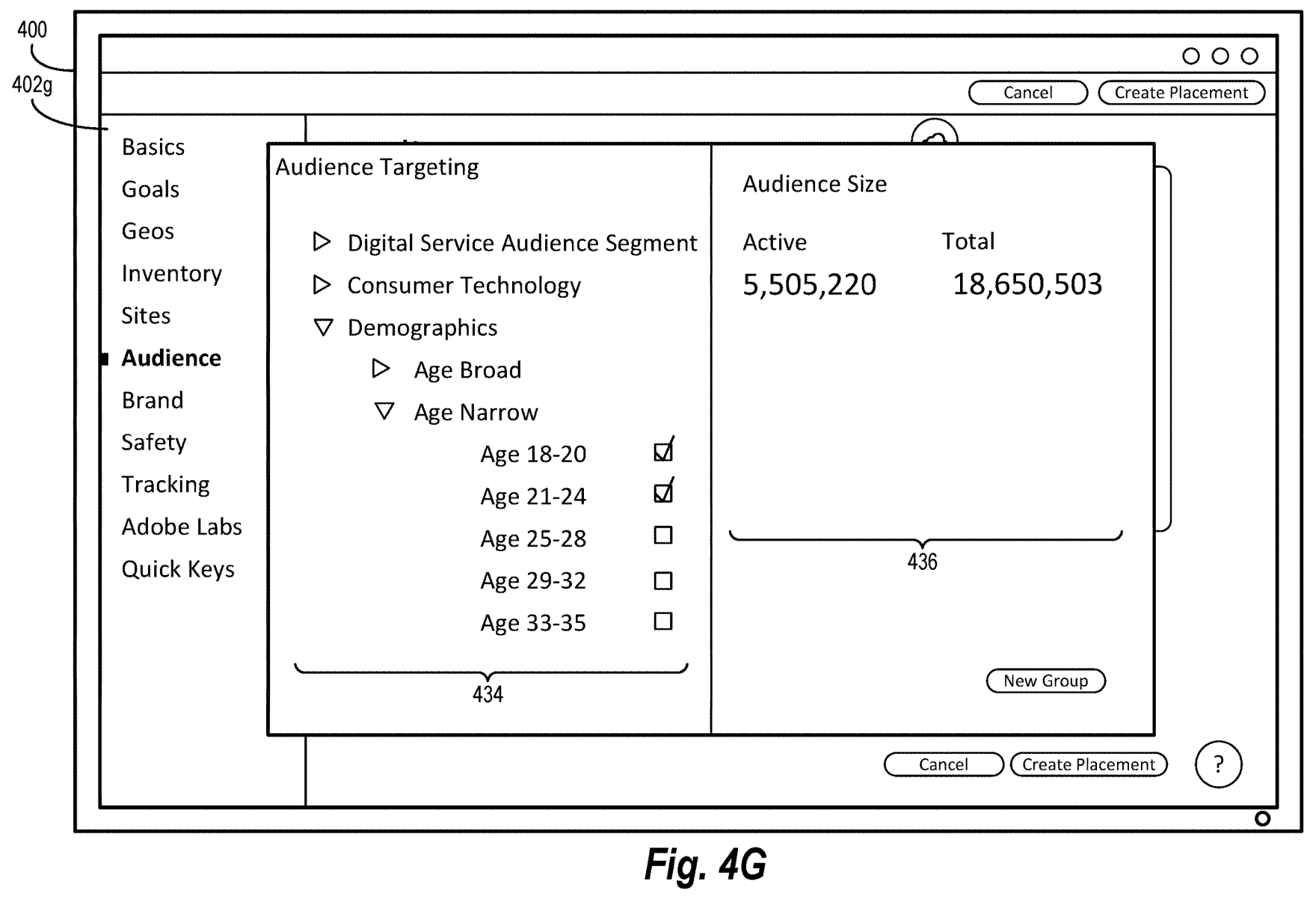

For example, in response to user input for selecting (or excluding) an audience, the computing device 400 presents a graphical user interface 402g, as shown in FIG. 4G. The graphical user interface 402g includes audience segments 434, which comprise digital service audience segments, consumer-type segments, demographic-based segments, etc. In response to user selection of one or more of the audience segments 434, the computing device 400 generates and presents a target-segment size 436 reflecting a size of the selected audience segments 434. Subsequently, in response to confirmation of the selected audience segments 434, the computing device 400 can update the graphical user interface 402f, as shown, for instance, in FIG. 4H.

Figure 4H:
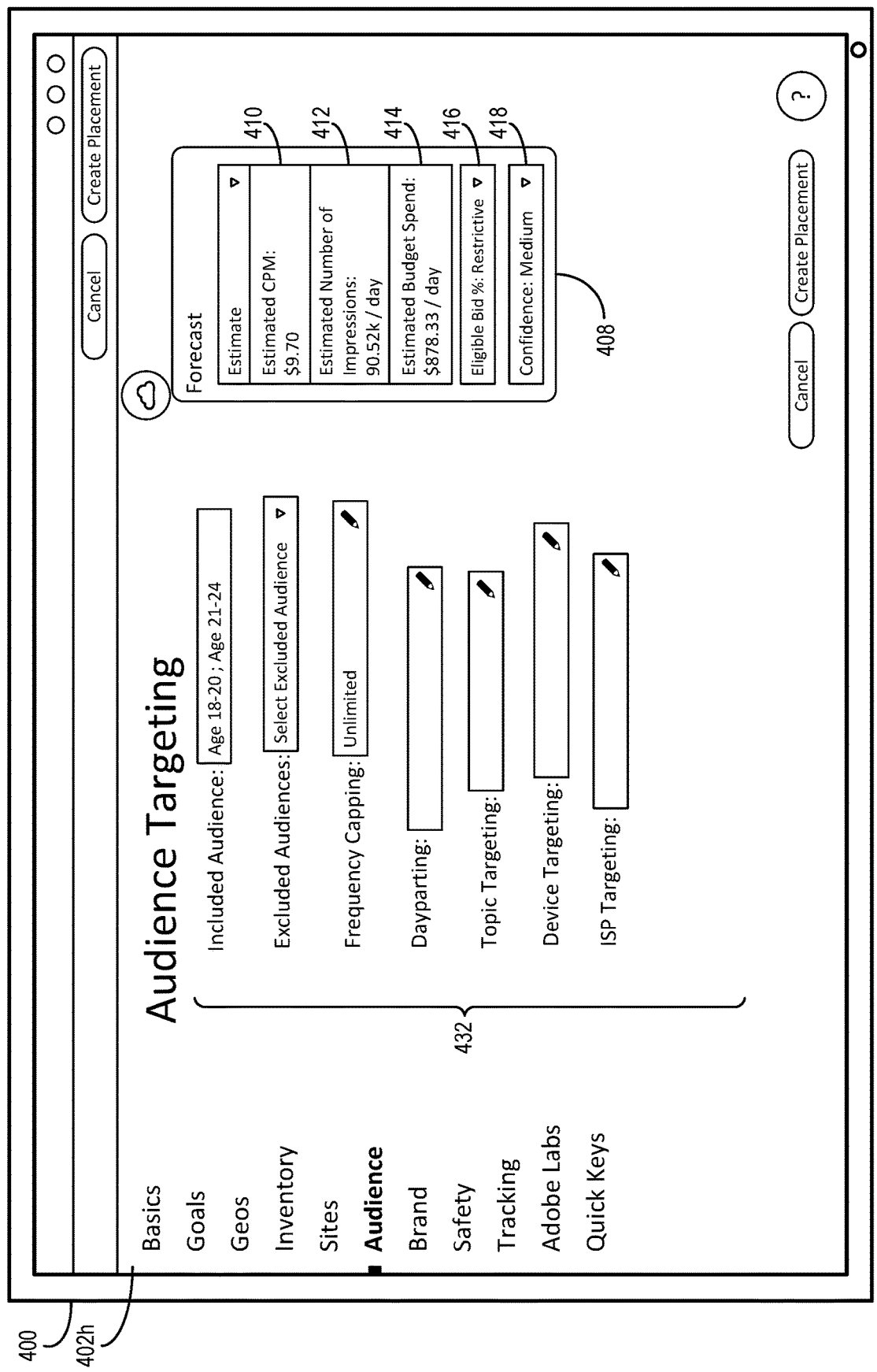

In FIG. 4H, the computing device 400 presents a graphical user interface 402h that updates the audience-segment options 432 to reflect the selected audience segments 434 (e.g., the targeted audience segments of "Age 18-20" and "Age 21-24"). In addition, FIG. 4H shows the computing device 400 updating the values for the prediction tool 408 relative to the values shown in FIG. 4F. For example, the estimated cost per quantity of impressions 410 reflects an updated value of $9.70, and the predicted expenditure 414 reflects an updated value of $878.33/day.

Figure 5:
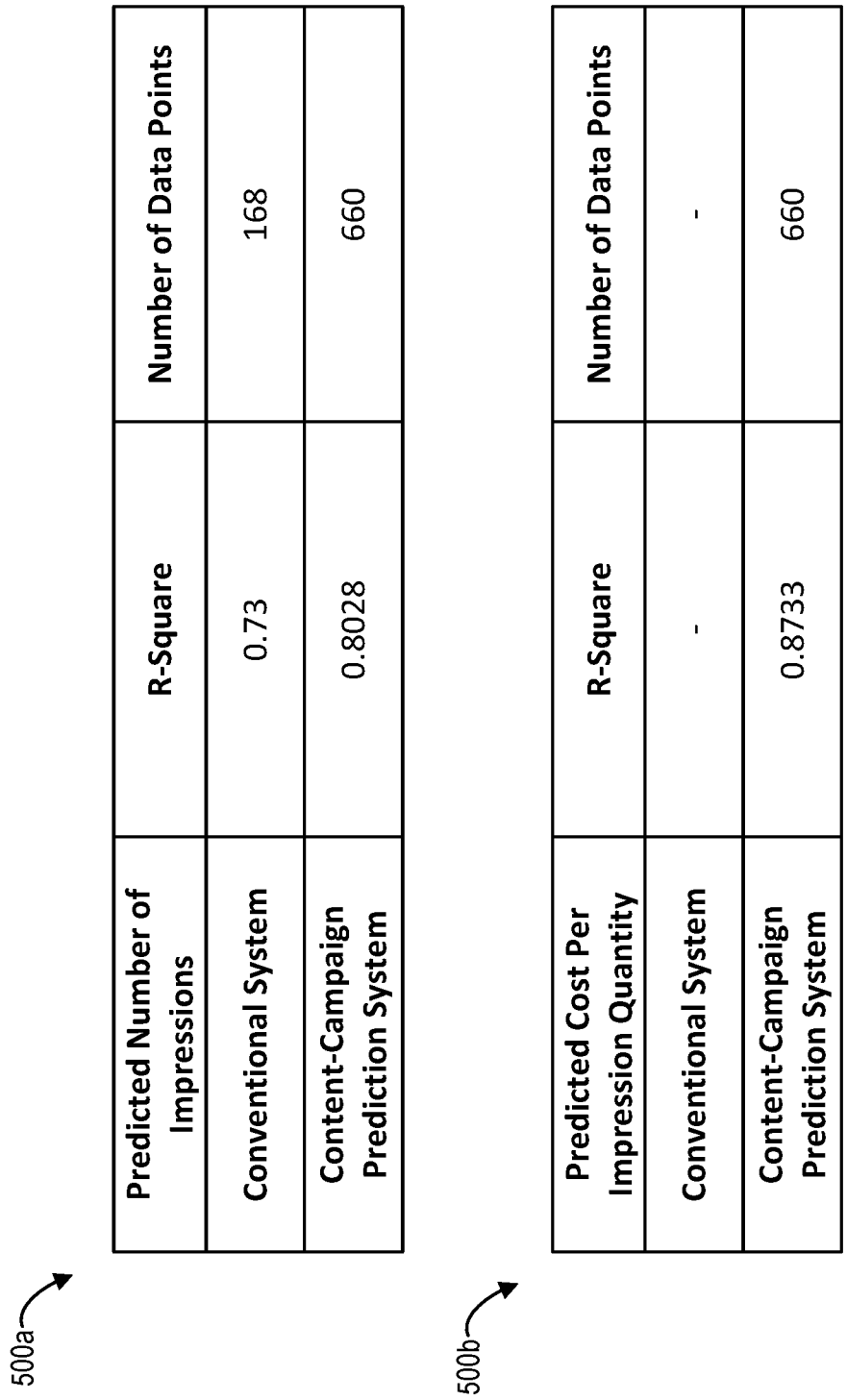
FIG. 5 illustrates a table reflecting example experimental results of a content-campaign-prediction system in accordance with one or more embodiments.

As mentioned above, the content-campaign-prediction system 106 can provide a number of technical improvements over conventional systems, including increased accuracy and system flexibility. FIG. 5 illustrates a table 500a indicating experimental results of the content-campaign-prediction system 106 in accordance with one or more embodiments. As shown in the table 500a of FIG. 5, a conventional campaign-forecasting system predicts numbers of impressions for sample digital-content campaigns based on sample targeting dimensions and sample expenditure constraints with an r-square value of 0.73. In comparison, the content-campaign-prediction system 106 demonstrates an approximately nine percent improvement by predicting numbers of impressions for the sample digital-content campaigns based on the sample targeting dimensions and the sample expenditure constraints with an r-square value of 0.8028.

As further shown in FIG. 5, a table 500b of FIG. 5 indicates that a conventional campaign-forecasting system does not have the flexibility or modeling to predict cost per quantity of impressions for a digital-content campaign. In contrast, the content-campaign-prediction system 106 can predict costs per quantity of impressions for sample digital-content campaigns based on sample targeting dimensions and sample expenditure constraints with an r-square value of 0.8733.

Figure 6:
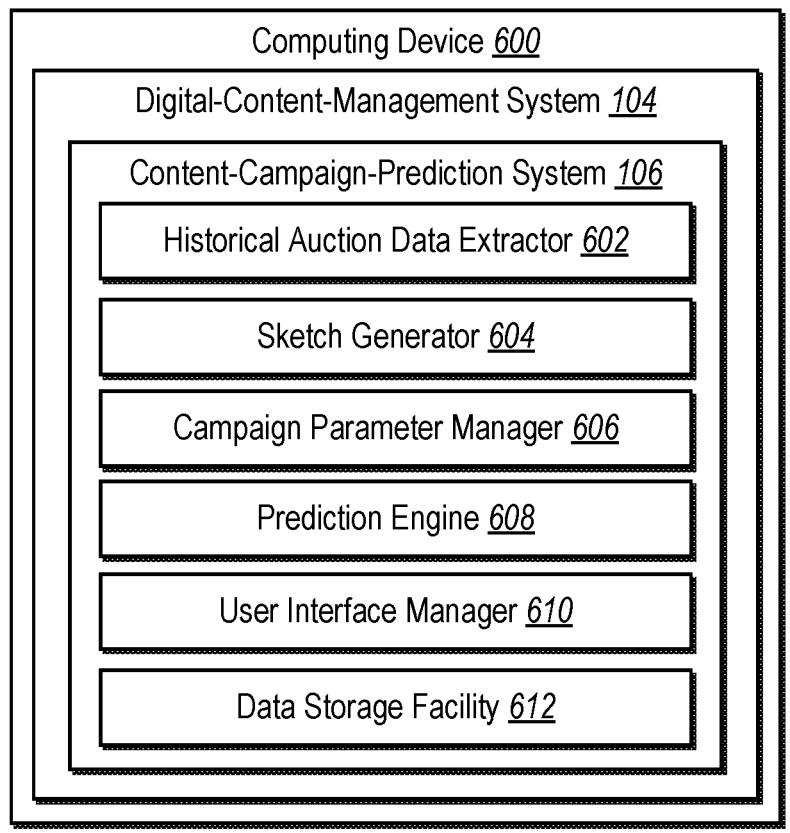
FIG. 6 illustrates an example schematic diagram of a content-campaign-prediction system in accordance with one or more embodiments.

Turning to FIG. 6, additional detail will now be provided regarding various components and capabilities of the content-campaign-prediction system 106. In particular, FIG. 6 illustrates an example schematic diagram of a computing device 600 (e.g., the server(s) 102, the client devices 108a-108n, the administrator device 112, and/or the third-party server 116) implementing the content-campaign-prediction system 106 in accordance with one or more embodiments of the present disclosure. As shown, the content-campaign-prediction system 106 is further implemented by the digital-content-management system 104. Also illustrated, the content-campaign-prediction system 106 can include a historical auction data extractor 602, a sketch generator 604, a campaign parameter manager 606, a prediction engine 608, a user interface manager 610, and a data storage facility 612.

The historical auction data extractor 602 can obtain, receive, request, provide, transmit, and/or manage historical auction data (as described in relation to the foregoing figures). In particular, the historical auction data extractor 602 can extract information from digital auctions performed as part of a real-time-bidding system. For example, the historical auction data extractor 602 can mine digital auction data utilizing one or more data mining techniques (e.g., that involve classifications, decision trees, statistical analyses, machine-learning models, and the like).

The sketch generator 604 can receive, transmit, analyze, generate, and/or manage tuple sketches (as described in relation to the foregoing figures). In particular, the sketch generator 604 can generate tuple sketches using historical auction data from the historical auction data extractor 602. After generating the tuple sketches, the sketch generator 604 can perform set operations based on targeting dimensions from the campaign parameter manager 606 to generate a corresponding set of sketches, generate an intersection of tuple sketches (e.g., a vector string of values), and/or generate respective distributions of values identified in the intersection of tuple sketches.

The campaign parameter manager 606 can receive, process, and/or manage campaign parameters (as described in relation to the foregoing figures). In particular, the campaign parameter manager 606 can receive (e.g., indications of user input from a campaign-prediction interface) targeting dimensions, expenditure constraints, and other criteria selectively identified for implementing a digital-content campaign. Subsequently, the campaign parameter manager 606 can provide the campaign parameters to the sketch generator 604 (e.g., for generating a set of tuple sketches that satisfy the targeting dimensions).

The prediction engine 608 can intelligently predict a cost per quantity of impressions and a number of impressions for implementing a digital-content campaign (as described in relation to the foregoing figures). In particular, the prediction engine 608 can utilize the generated intersection of tuple sketches and/or the generated distributions from the sketch generator 604 to estimate a cost per quantity of impressions and estimate a number of impressions. For example, the prediction engine 608 can generate the predicted cost per quantity of impressions by determining an average clearing-bid value based on a distribution of clearing-bid values. Similarly, the prediction engine 608 can generate the predicted number of impressions by determining an average bid-success rate based on a distribution of bid-success rates and multiplying the average bid-success rate by a bid count.

The user interface manager 610 can provide, manage, and/or control a graphical user interface (or simply "user interface"). In particular, the user interface manager 610 may generate and display a user interface by way of a display screen composed of a plurality of graphical components, objects, and/or elements that allow a user to perform a function. For example, the user interface manager 610 can receive user inputs from a user, such as a click/tap to select a targeting dimension or provide an expenditure constraint. Additionally, the user interface manager 610 can present a variety of types of information, including digital-content placements comprising text, digital media items, search results, product recommendations, or other information.

The data storage facility 612 maintains data for the content-campaign-prediction system 106. The data storage facility 612 (e.g., via one or more memory devices) can maintain data of any type, size, or kind, as necessary to perform the functions of the content-campaign-prediction system 106. For example, in some embodiments, the data storage facility 612 comprises a sketch generator (e.g., the sketch generator 604) and historical auction data (e.g., from the historical auction data extractor 602) for bids on digital-content placements.

Each of the components of the computing device 600 can include software, hardware, or both. For example, the components of the computing device 600 can include one or more instructions stored on a computer-readable storage medium and executable by processors of one or more computing devices, such as a client device or server device. When executed by the one or more processors, the computer-executable instructions of the content-campaign-prediction system 106 can cause the computing device(s) (e.g., the computing device 600) to perform the methods described herein. Alternatively, the components of the computing device 600 can include hardware, such as a special-purpose processing device to perform a certain function or group of functions. Alternatively, the components of the computing device 600 can include a combination of computer-executable instructions and hardware.

Furthermore, the components of the computing device 600 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 600 may be implemented as a stand-alone application, such as a desktop or mobile application. Furthermore, the components of the computing device 600 may be implemented as one or more web-based applications hosted on a remote server.

The components of the computing device 600 may also be implemented in a suite of mobile device applications or "apps." To illustrate, the components of the computing device 600 may be implemented in an application, including but not limited to ADOBE® ANALYTICS, ADOBE® AUDIENCE MANAGER, ADOBE® EXPERIENCE MANAGER, ADOBE® CAMPAIGN, ADOBE® ADVERTISING, ADOBE® TARGET, or ADOBE® COMMERCE CLOUD. Product names, including "ADOBE" and any other portion of one or more of the foregoing product names may include registered trademarks or trademarks of Adobe Inc. in the United States and/or other countries.

Figure 7:
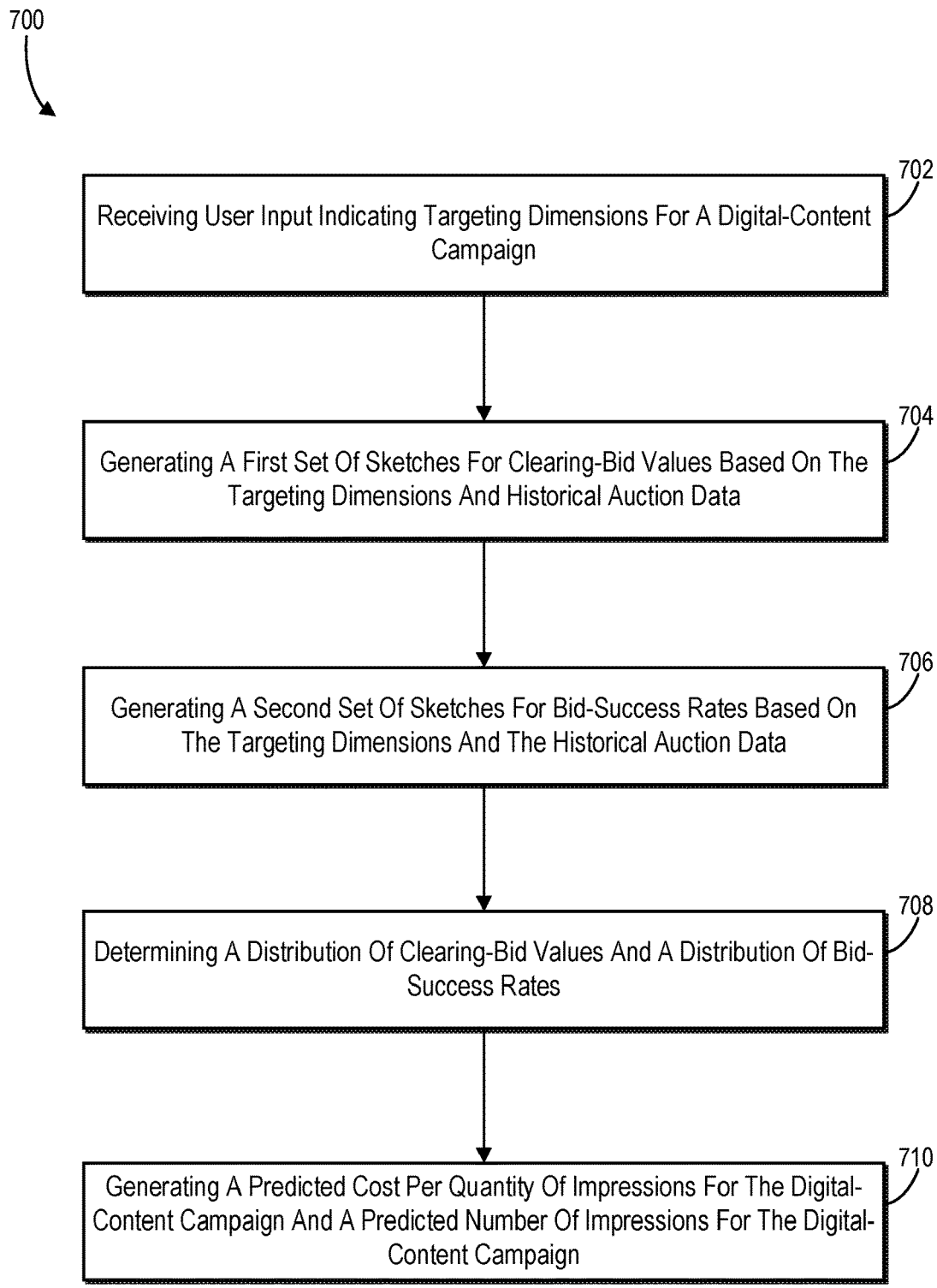
FIG. 7 illustrates a flowchart of a series of acts for generating a predicted cost per quantity of impressions and a predicted number of impressions in accordance with one or more embodiments.

FIGS. 1-6, the corresponding text, and the examples provide several different systems, methods, techniques, components, and/or devices of the content-campaign-prediction system 106 in accordance with one or more embodiments. In addition to the above description, one or more embodiments can also be described in terms of flowcharts including acts for accomplishing a particular result. For example, FIG. 7 illustrates a flowchart of a series of acts 700 for generating a predicted cost per quantity of impressions and a predicted number of impressions in accordance with one or more embodiments. The content-campaign-prediction system 106 may perform one or more acts of the series of acts 700 in addition to or alternatively to one or more acts described in conjunction with other figures. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown, the series of acts 700 includes an act 702 of receiving user input indicating targeting dimensions for a digital-content campaign. In some implementations, act 702 comprises receiving user input indicating an expenditure constraint for the digital-content campaign. The series of acts 700 further includes an act 704 of generating a first set of sketches for clearing-bid values based on the targeting dimensions and historical auction data. In some embodiments, generating the first set of sketches for clearing-bid values comprises performing, utilizing a sketch generator, multi-dimensional set operations on particular tuple sketches to generate a first intersection of tuple sketches for clearing-bid values. In one or more implementations, generating the first set of sketches for clearing-bid values comprises generating the first set of sketches for clearing-bid values to include both the clearing-bid values and auction identifiers corresponding to the clearing-bid values.

The series of acts 700 further includes an act 706 of generating a second set of sketches for bid-success rates based on the targeting dimensions and the historical auction data. In some embodiments, generating the second set of sketches for bid-success rates comprises performing, utilizing the sketch generator, multi-dimensional set operations on particular tuple sketches to generate a second intersection of tuple sketches for bid-success rates. In one or more implementations, generating the second set of sketches for bid-success rates comprises generating the second set of sketches for bid-success rates to include both the bid-success rates and auction identifiers corresponding to the bid-success rates.

The series of acts 700 further includes an act 708 of determining a distribution of clearing-bid values and a distribution of bid-success rates. In some implementations, determining a distribution of clearing-bid values is based on clearing-bid values from the first set of sketches, and determining a distribution of bid-success rates is based on bid-success rates from the second set of sketches. In some embodiments, determining the distribution of clearing-bid values comprises determining an empirical distribution from a first auction dataset of the historical auction data that, as indicated by the first intersection of tuple sketches for clearing-bid values, satisfies the targeting dimensions. Similarly, in some embodiments, determining the distribution of bid-success rates comprises determining an empirical distribution from a second auction dataset of the historical auction data that, as indicated by the second intersection of tuple sketches for bid-success rates, satisfies the targeting dimensions. For example, determining the distribution of bid-success rates comprises determining a distribution curve of bid-success rates based on a count of the bid-success rates from the second set of sketches.

The series of acts 700 further includes an act 710 of generating a predicted cost per quantity of impressions for the digital-content campaign and a predicted number of impressions for the digital-content campaign. In some implementations, act 710 comprises generating, for display by the client device, a predicted cost per quantity of impressions for the digital-content campaign based on the distribution of clearing-bid values and a predicted number of impressions for the digital-content campaign based on the distribution of bid-success rates (e.g., in response to the user input indicating the targeting dimensions). In some embodiments, generating the predicted cost per quantity of impressions comprises determining an average clearing-bid value based on the distribution of clearing-bid values. For example, generating the predicted cost per quantity of impressions comprises quantifying an area under the distribution curve of clearing-bid values to identify an estimated clearing-bid value. Similarly, in some embodiments, generating the predicted number of impressions comprises determining an average bid-success rate based on the distribution of bid-success rates and multiplying the average bid-success rate by a bid count. Specifically, in some cases, generating the predicted number of impressions comprises quantifying an area under the distribution curve of bid-success rates to identify an estimated bid-success rate and multiplying the estimated bid-success rate by a bid count.

It is understood that the outlined acts in the series of acts 700 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 7, act(s) in the series of acts 700 may include an act of (i) modifying the first set of sketches in response to receiving additional clearing-bid values of the historical auction data, (ii) determining a modified distribution of clearing-bid values based on the additional clearing-bid values from the first set of sketches, and (iii) generating, for display by the client device, an updated predicted cost per quantity of impressions for the digital-content campaign based on the modified distribution of clearing-bid values.

As another example act not shown in FIG. 7, act(s) in the series of acts 700 can include an act of (i) modifying the second set of sketches in response to receiving additional bid-success rates of the historical auction data, (ii) determining a modified distribution of bid-success rates based on the additional bid-success rates from the second set of sketches, and (iii) generating, for display by the client device, an updated predicted number of impressions for the digital-content campaign based on the modified distribution of bid-success rates.

As a further example act not shown in FIG. 7, act(s) in the series of acts 700 can include an act of (i) receiving the user input indicting the targeting dimensions by receiving an indication of at least one of a geographical audience segment, a digital service audience segment, or a site-type segment, (ii) generating, utilizing the sketch generator, the first set of sketches for clearing-bid values by performing a tuple-sketch algorithm on an auction dataset satisfying the at least one of the geographical audience segment, the digital service audience segment, or the site-type segment, and (iii) generating, utilizing the sketch generator, the second set of sketches for bid-success rates by performing the tuple-sketch algorithm on the auction dataset.

As an additional example act not shown in FIG. 7, act(s) in the series of acts 700 can include an act of (i) receiving, from the client device, user input indicating an expenditure constraint for the digital-content campaign, (ii) determining a predicted expenditure for the digital-content campaign by multiplying the predicted number of impressions by the predicted cost per quantity of impressions, and (iii) providing, for display within a campaign-prediction interface of the client device, the predicted expenditure in response to the user input indicating the targeting dimensions and the expenditure constraint.

As still another example act not shown in FIG. 7, act(s) in the series of acts 700 can include an act of (i) determining the first intersection of the tuple sketches for clearing-bid values by generating a first vector comprising clearing-bid values associated with digital auction identifiers of historical auctions from the auction dataset satisfying the targeting dimensions, and (ii) determining the second intersection of the tuple sketches for bid-success rates by generating a second vector comprising bid-success rates associated with digital auction identifiers of historical auctions from the auction dataset satisfying the targeting dimensions.

In another example act not shown in FIG. 7, act(s) in the series of acts 700 can include an act of (i) determining the distribution of clearing-bid values by determining an empirical distribution from a first vector comprising clearing-bid values extracted from the first intersection of tuple sketches for clearing-bid values, and (ii) determining the distribution of the bid-success rates by determining an empirical distribution from a second vector comprising bid-success rates extracted from the second intersection of tuple sketches for bid-success rates.

As a further example act not shown in FIG. 7, act(s) in the series of acts 700 can include an act of (i) determining a distribution curve based on a function fitted to clearing-bid values of a vector extracted from the first intersection of tuple sketches for clearing-bid values, (ii) performing a truncated integration of the function over a clearing-bid-value interval of zero to a max-bid value, and (iii) determining an average clearing-bid value based on the truncated integration of the function.

In an additional example act not shown in FIG. 7, act(s) in the series of acts 700 can include an act of (i) determining a distribution curve based on a function fitted to bid-success rates of a vector extracted from the second intersection of tuple sketches for bid-success rates, (ii) performing an open-interval integration of the function, and (iii) determining an average bid-success rate based on the open-interval integration of the function.

In yet another example act not shown in FIG. 7, act(s) in the series of acts 700 can include an act of (i) receiving, from the client device, additional user input indicating at least one of different targeting dimensions or an expenditure constraint for the digital-content campaign, (ii) generating, utilizing the sketch generator, a first updated intersection of tuple sketches for clearing-bid values and a second updated intersection of tuple sketches for bid-success rates, (iii) determining an updated distribution of clearing-bid values and an updated distribution of bid-success rates from the auction dataset satisfying the different targeting dimensions based on the first updated intersection of tuple sketches and the second updated intersection of tuple sketches, and (iv) in response to the additional user input, generating, for display by the client device, an updated predicted cost per quantity of impressions for the digital-content campaign based on the updated distribution of clearing-bid values and an updated predicted number of impressions for the digital-content campaign based on the updated distribution of bid-success rates.

As another example act not shown in FIG. 7, act(s) in the series of acts 700 can include an act of (i) receiving, from the client device via the campaign-prediction interface, user input indicating an expenditure constraint for the digital-content campaign, (ii) determining a predicted expenditure for the digital-content campaign by multiplying the predicted number of impressions by the predicted cost per quantity of impressions, (iii) determining an expenditure difference value between the expenditure constraint and the predicted expenditure, and (iv) providing, for display within the campaign-prediction interface of the client device, the expenditure difference value in response to the user input indicating the targeting dimensions and the expenditure constraint.

In another example act not shown in FIG. 7, act(s) in the series of acts 700 can include an act of generating the plurality of tuple sketches based on the historical auction data by associating, for each tuple sketch of the plurality of tuple sketches, at least one of a bid-success rate or a clearing-bid value with a corresponding hash value for a digital auction identifier.

In a further example act not shown in FIG. 7, act(s) in the series of acts 700 can include an act of receiving user input indicating the targeting dimensions for the digital-content campaign by (i) receiving a first set of dimensions defining a target segment to receive digital content from the digital-content campaign, and (ii) receiving a second set of dimensions defining an excluded segment to be excluded from the digital-content campaign.

Additionally or alternatively to the acts described above, in some embodiments, the series of acts 700 can include (i) generating, utilizing the sketch generator, a plurality of tuple sketches based on the historical auction data, (ii) receiving, from a client device, user input indicating targeting dimensions and an expenditure constraint for a digital-content campaign, (iii) generating, utilizing the sketch generator, a first intersection of tuple sketches for clearing-bid values and a second intersection of tuple sketches for bid-success rates by performing multi-dimensional set operations on particular tuple sketches from the plurality of tuple sketches, (iv) determining a distribution of clearing-bid values from an auction dataset satisfying the targeting dimensions based on the first intersection of tuple sketches, (v) determining a distribution of bid-success rates from the auction dataset satisfying the targeting dimensions based on the second intersection of tuple sketches, and (vi) in response to the user input indicating the targeting dimensions and the expenditure constraint, generating, for display by the client device, a predicted cost per quantity of impressions for the digital-content campaign based on the distribution of clearing-bid values and a predicted number of impressions for the digital-content campaign based on the distribution of bid-success rates.

Additionally or alternatively to the acts described above, in some embodiments, the series of acts 700 can include (i) generating, utilizing a sketch generator, a plurality of tuple sketches based on historical auction data for bids on digital-content placements, (ii) receiving, from a client device via a campaign-prediction interface, user input indicating targeting dimensions for a digital-content campaign, and (iii) in response to receiving the indication of the user input, providing, for display within the campaign-prediction interface of the client device, the predicted cost per quantity of impressions and the predicted number of impressions.

In addition (or in the alternative) to the acts described above, in some embodiments, a disclosed method can include performing (or the content-campaign-prediction system 106 can perform) a step for generating a predicted cost per quantity of impressions and a predicted number of impressions for the digital-content campaign utilizing the sketch generator. For instance, the acts and algorithms described above in relation to FIGS. 3A and 3B can comprise the corresponding acts (or structure) for a step for generating a predicted cost per quantity of impressions and a predicted number of impressions for the digital-content campaign utilizing the sketch generator.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
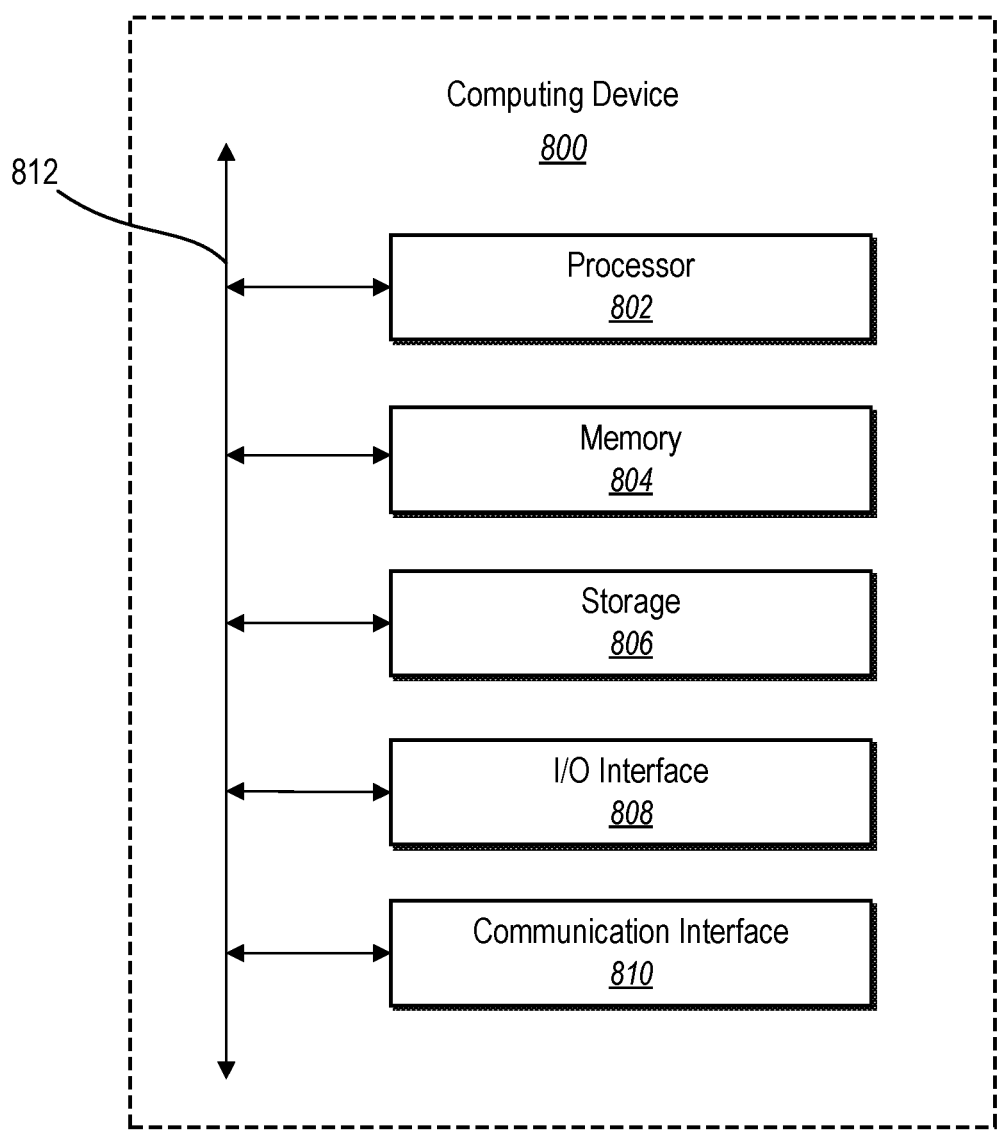
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., the computing device 400, the computing device 600, the server(s) 102, the administrator device 112, the client devices 108a-108n, and/or the third-party server 116). In one or more embodiments, the computing device 800 may be a mobile device (e.g., a mobile telephone, a smartphone, a PDA, a tablet, a laptop, a camera, a tracker, a watch, a wearable device). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of the computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium comprising instructions that, when executed by at least one processor, cause a computing device to:
   receive, from a client device, user input indicating targeting dimensions for a digital-content campaign;
   generate, utilizing a sketch generator, a first set of sketches for clearing-bid values based on the targeting dimensions and historical auction data;
   generate, utilizing the sketch generator, a second set of sketches for bid-success rates based on the targeting dimensions and the historical auction data;
   determine a distribution of clearing-bid values based on clearing-bid values from the first set of sketches and a distribution of bid-success rates based on bid-success rates from the second set of sketches; and
   in response to the user input indicating the targeting dimensions, generate, for display by the client device, a predicted cost per quantity of impressions for the digital-content campaign based on the distribution of clearing-bid values and a predicted number of impressions for the digital-content campaign based on the distribution of bid-success rates.

2. The non-transitory computer-readable storage medium of claim 1, further comprising instructions that, when executed by the at least one processor, cause the computing device to:
   generate the predicted cost per quantity of impressions by determining an average clearing-bid value based on the distribution of clearing-bid values; and
   generate the predicted number of impressions by determining an average bid-success rate based on the distribution of bid-success rates and multiplying the average bid-success rate by a bid count.

3. The non-transitory computer-readable storage medium of claim 1, further comprising instructions that, when executed by the at least one processor, cause the computing device to:
   generate, utilizing the sketch generator, the first set of sketches for clearing-bid values by performing multi-dimensional set operations on particular tuple sketches to generate a first intersection of tuple sketches for clearing-bid values; and
   generate, utilizing the sketch generator, the second set of sketches for bid-success rates by performing multi-dimensional set operations on particular tuple sketches to generate a second intersection of tuple sketches for bid-success rates.

4. The non-transitory computer-readable storage medium of claim 3, further comprising instructions that, when executed by the at least one processor, cause the computing device to:
   determine the distribution of clearing-bid values by determining an empirical distribution from a first auction dataset of the historical auction data that, as indicated by the first intersection of tuple sketches for clearing-bid values, satisfies the targeting dimensions; and
   determine the distribution of bid-success rates by determining an empirical distribution from a second auction dataset of the historical auction data that, as indicated by the second intersection of tuple sketches for bid-success rates, satisfies the targeting dimensions.

5. The non-transitory computer-readable storage medium of claim 1, further comprising instructions that, when executed by the at least one processor, cause the computing device to generate, utilizing the sketch generator, the first set of sketches for clearing-bid values and the second set of sketches for bid-success rates by:
   generating the first set of sketches for clearing-bid values to include both the clearing-bid values and auction identifiers corresponding to the clearing-bid values; and
   generating the second set of sketches for bid-success rates to include both the bid-success rates and auction identifiers corresponding to the bid-success rates.

6. The non-transitory computer-readable storage medium of claim 1, further comprising instructions that, when executed by the at least one processor, cause the computing device to:
   determine the distribution of bid-success rates by determining a distribution curve of bid-success rates based on a count of the bid-success rates from the second set of sketches; and
   generate the predicted number of impressions by quantifying an area under the distribution curve of bid-success rates and multiplying the quantified area by a bid count.

7. The non-transitory computer-readable storage medium of claim 1, further comprising instructions that, when executed by the at least one processor, cause the computing device to:
   modify the first set of sketches in response to receiving additional clearing-bid values of the historical auction data;
   determine a modified distribution of clearing-bid values based on the additional clearing-bid values from the first set of sketches; and
   generate, for display by the client device, an updated predicted cost per quantity of impressions for the digital-content campaign based on the modified distribution of clearing-bid values.

8. The non-transitory computer-readable storage medium of claim 1, further comprising instructions that, when executed by the at least one processor, cause the computing device to:
   modify the second set of sketches in response to receiving additional bid-success rates of the historical auction data;
   determine a modified distribution of bid-success rates based on the additional bid-success rates from the second set of sketches; and
   generate, for display by the client device, an updated predicted number of impressions for the digital-content campaign based on the modified distribution of bid-success rates.

9. The non-transitory computer-readable storage medium of claim 1, further comprising instructions that, when executed by the at least one processor, cause the computing device to:
   receive the user input indicting the targeting dimensions by receiving an indication of at least one of a geographical audience segment, a digital service audience segment, or a site-type segment;
   generate, utilizing the sketch generator, the first set of sketches for clearing-bid values by performing a tuple-sketch algorithm on an auction dataset satisfying the at least one of the geographical audience segment, the digital service audience segment, or the site-type segment; and generate, utilizing the sketch generator, the second set of sketches for bid-success rates by performing the tuple-sketch algorithm on the auction dataset.

10. The non-transitory computer-readable storage medium of claim 1, further comprising instructions that, when executed by the at least one processor, cause the computing device to:

receive, from the client device, user input indicating an expenditure constraint for the digital-content campaign;

determine a predicted expenditure for the digital-content campaign by multiplying the predicted number of impressions by the predicted cost per quantity of impressions; and provide, for display within a campaign-prediction interface of the client device, the predicted expenditure in response to the user input indicating the targeting dimensions and the expenditure constraint.

11. A system comprising:

one or more memory devices comprising a sketch generator and historical auction data for bids on digital-content placements; and one or more computing devices configured to cause the system to:

generate, utilizing the sketch generator, a plurality of tuple sketches based on the historical auction data;

receive, from a client device, user input indicating targeting dimensions for a digital-content campaign;

generate, utilizing the sketch generator, a first intersection of tuple sketches for clearing-bid values and a second intersection of tuple sketches for bid-success rates by performing multi-dimensional set operations on particular tuple sketches from the plurality of tuple sketches;

determine a distribution of clearing-bid values from an auction dataset satisfying the targeting dimensions based on the first intersection of tuple sketches;

determine a distribution of bid-success rates from the auction dataset satisfying the targeting dimensions based on the second intersection of tuple sketches; and in response to the user input indicating the targeting dimensions, generate, for display by the client device, a predicted cost per quantity of impressions for the digital-content campaign based on the distribution of clearing-bid values and a predicted number of impressions for the digital-content campaign based on the distribution of bid-success rates.

12. The system of claim 11, wherein the one or more computing devices are configured to cause the system to:

determine the first intersection of the tuple sketches for clearing-bid values by generating a first vector comprising clearing-bid values associated with digital auction identifiers of historical auctions from the auction dataset satisfying the targeting dimensions; and determine the second intersection of the tuple sketches for bid-success rates by generating a second vector comprising bid-success rates associated with digital auction identifiers of historical auctions from the auction dataset satisfying the targeting dimensions.

13. The system of claim 11, wherein the one or more computing devices are configured to cause the system to:

determine the distribution of clearing-bid values by determining an empirical distribution from a first vector comprising clearing-bid values extracted from the first intersection of tuple sketches for clearing-bid values; and determine the distribution of the bid-success rates by determining an empirical distribution from a second vector comprising bid-success rates extracted from the second intersection of tuple sketches for bid-success rates.

14. The system of claim 11, wherein the one or more computing devices are configured to cause the system to generate the predicted cost per quantity of impressions by:

determining a distribution curve based on a function fitted to clearing-bid values of a vector extracted from the first intersection of tuple sketches for clearing-bid values;

performing a truncated integration of the function over a clearing-bid-value interval of zero to a max-bid value; and determining an average clearing-bid value based on the truncated integration of the function.

15. The system of claim 11, wherein the one or more computing devices are configured to cause the system to generate the predicted number of impressions by:

determining a distribution curve based on a function fitted to bid-success rates of a vector extracted from the second intersection of tuple sketches for bid-success rates;

performing an open-interval integration of the function; and determining an average bid-success rate based on the open-interval integration of the function.

16. The system of claim 11, wherein the one or more computing devices are configured to cause the system to:

receive, from the client device, additional user input indicating at least one of different targeting dimensions or an expenditure constraint for the digital-content campaign;

generate, utilizing the sketch generator, a first updated intersection of tuple sketches for clearing-bid values and a second updated intersection of tuple sketches for bid-success rates;

determine an updated distribution of clearing-bid values and an updated distribution of bid-success rates from the auction dataset satisfying the different targeting dimensions based on the first updated intersection of tuple sketches and the second updated intersection of tuple sketches; and in response to the additional user input, generate, for display by the client device, an updated predicted cost per quantity of impressions for the digital-content campaign based on the updated distribution of clearing-bid values and an updated predicted number of impressions for the digital-content campaign based on the updated distribution of bid-success rates.

17. A computer-implemented method comprising:

receiving, from a client device, user input indicating targeting dimensions for a digital-content campaign;

generating, utilizing a sketch generator, a first set of sketches for clearing-bid values based on the targeting dimensions and historical auction data;

generating, utilizing the sketch generator, a second set of sketches for bid-success rates based on the targeting dimensions and the historical auction data;

determining a distribution of clearing-bid values based on clearing-bid values from the first set of sketches and a distribution of bid-success rates based on bid-success rates from the second set of sketches; and in response to the user input indicating the targeting dimensions, generating, for display by the client device, a predicted cost per quantity of impressions for the digital-content campaign based on the distribution of clearing-bid values and a predicted number of impressions for the digital-content campaign based on the distribution of bid-success rates.

18. The computer-implemented method of claim 17, further comprising:

receiving, from the client device via a campaign-prediction interface, user input indicating an expenditure constraint for the digital-content campaign;

determining a predicted expenditure for the digital-content campaign by multiplying the predicted number of impressions by the predicted cost per quantity of impressions;

determining an expenditure difference value between the expenditure constraint and the predicted expenditure; and providing, for display within the campaign-prediction interface of the client device, the expenditure difference value in response to the user input indicating the targeting dimensions and the expenditure constraint.

19. The computer-implemented method of claim 17, wherein:

generating the first set of sketches comprises generating hash representations that compress the clearing-bid values; and generating the second set of sketches comprises generating additional hash representations that compress the bid-success rates.

20. The computer-implemented method of claim 17, wherein receiving user input indicating the targeting dimensions for the digital-content campaign comprises:

receiving a first set of dimensions defining a target segment to receive digital content from the digital-content campaign; and receiving a second set of dimensions defining an excluded segment to be excluded from the digital-content campaign.

* * * * *